US010588135B2

(12) United States Patent
Chendamarai Kannan et al.

(10) Patent No.: US 10,588,135 B2
(45) Date of Patent: Mar. 10, 2020

(54) TECHNIQUES FOR HANDLING BURSTY INTERFERENCE IN A SHARED RADIO FREQUENCY SPECTRUM BAND

(71) Applicant: QUALCOMM Incorporated, San Diego, CA (US)

(72) Inventors: Arumugam Chendamarai Kannan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 14/938,604

(22) Filed: Nov. 11, 2015

(65) Prior Publication Data

US 2016/0143043 A1 May 19, 2016

Related U.S. Application Data

(60) Provisional application No. 62/134,336, filed on Mar. 17, 2015, provisional application No. 62/080,078, filed on Nov. 14, 2014.

(51) Int. Cl.
*H04W 72/02* (2009.01)
*H04W 72/08* (2009.01)
(Continued)

(52) U.S. Cl.
CPC ......... *H04W 72/082* (2013.01); *H04L 1/0002* (2013.01); *H04L 1/0003* (2013.01);
(Continued)

(58) Field of Classification Search
CPC .................................................. H04W 72/082
See application file for complete search history.

(56) References Cited

U.S. PATENT DOCUMENTS 9,596,615 B1* 3/2017 Sun ....................... H04L 1/0026
2009/0016231 A1 1/2009 Li et al.
(Continued)

FOREIGN PATENT DOCUMENTS

WO WO-2013090334 A1 6/2013
WO WO-2013133607 A1 9/2013
(Continued)

OTHER PUBLICATIONS

ISA/EPO, Partial International Search Report of the International Searching Authority, Int'l. App. No. PCT/US2015/060416, dated Feb. 15, 2016, European Patent Office, Rijswijk, NL, 6 pgs.
(Continued)

*Primary Examiner* — Sulaiman Nooristany
(74) *Attorney, Agent, or Firm* — Holland & Hart LLP

(57) ABSTRACT

Techniques are described for wireless communication. A first method includes determining, at a user equipment (UE), that the UE is exposed to a bursty interference in a shared radio frequency spectrum band, and modifying, based at least in part on the bursty interference, a feedback message reporting by the UE to a base station. A second method includes determining, at a base station, that a UE is exposed to a bursty interference in a shared radio frequency spectrum band, and modifying, based at least in part on the bursty interference, one or more of: a link adaptation for the UE or a transmission schedule for the UE.

36 Claims, 13 Drawing Sheets

(51) Int. Cl.
*H04L 1/18* (2006.01)
*H04L 1/00* (2006.01)
*H04L 1/16* (2006.01)
*H04W 72/04* (2009.01)
*H04L 5/00* (2006.01)

(52) U.S. Cl.
CPC .......... *H04L 1/0009* (2013.01); *H04L 1/0015* (2013.01); *H04L 1/0026* (2013.01); *H04L 1/0028* (2013.01); *H04L 1/1671* (2013.01); *H04L 1/1825* (2013.01); *H04L 1/1854* (2013.01); *H04W 72/048* (2013.01); *H04L 5/001* (2013.01); *H04L 5/0023* (2013.01); *H04L 5/0055* (2013.01)

(56) References Cited

U.S. PATENT DOCUMENTS

| | | | | |
|---|---|---|---|---|
| 2013/0094382 | A1* | 4/2013 | Ahn | H04B 7/26 370/252 |
| 2013/0155973 | A1* | 6/2013 | Geirhofer | H04B 7/0632 370/329 |
| 2013/0225149 | A1 | 8/2013 | Sadek et al. | |
| 2013/0315198 | A1 | 11/2013 | Krishna et al. | |
| 2014/0071894 | A1 | 3/2014 | Kairouz et al. | |
| 2014/0198872 | A1* | 7/2014 | Barriac | H04L 1/1621 375/285 |
| 2015/0071193 | A1 | 3/2015 | Seo | |

FOREIGN PATENT DOCUMENTS

| WO | WO-2013177184 A1 | 11/2013 |
|---|---|---|
| WO | WO-2014110390 A1 | 7/2014 |

OTHER PUBLICATIONS

ISA/EPO, International Search Report and Written Opinion of the International Searching Authority, Int'l. App. No. PCT/US2015/060416, dated Apr. 25, 2016, European Patent Office, Rijswijk, NL, 18 pgs.

LG Electronics, "CSI Feedback and Handling Interference Variation in Unlicensed Band [online]," 3GPP TSG RAN WG1 Meeting #79, R1-144902, Nov. 8, 2014, 5 pages, URL: http://www.3gpp.org/ftp/tsg_ran/WG1_RL1/TSGR1_79/Docs/R1-144902.zip.

LG Electronics: "Measurement and synchronization in LAA", 3GPP TSG-RAN WG1#79 R1-144903, Nov. 8, 2014, URL: https://www.3gpp.org/ftp/tsg_ran/WG1_RL1/TSGR1_79/Docs/ , 6 pages,(In particular, see Section 2.2).

Samsung, "Discussion on CSI Measurement Aspects for LAA [online]," 3GPP TSG RAN WG1 #79, R1-144743, Nov. 8, 2014, 3 pages, URL: http://www.3gpp.org/ftp/tsg_ran/WG1_RL1/TSGR1_79/Docs/R1-144743.zip ,(In particular, see Section 2).

NTT DOCOMO: "Views on PHY layer options for LAA DL", 3GPP TSG RAN WG1 Meeting #79, R1-145107, Nov. 21, 2014, pp. 1-7, URL: http://www.3gpp.org/ftp/tsg_ran/WG1_RL1/TSGR1_79/Docs/R1-145107.zip ,(In particular, see item of "Collision avoidance mechanism for hidden node problem" in p. 5/7).

NTT DOCOMO: "Inter-Operator and Inter-RAT Co-existence Techniques for LAA using LTE," 3GPP Draft; R1-144339 Inter-Operator and Inter-RAT Co-existence Techniques for LAA using LTE Final, 3rd Generation Partnership Project (3GPP), Mobile Competence Centre; 650, Route Des Lucioles; F-06, vol. RAN WG1, No. Ljubljana, Slovenia; Oct. 6, 2014-Oct. 10, 2014, Oct. 9, 2014 (Oct. 9, 2014), XP050885136, 6 pages, Retrieved from the Internet: URL: http://www.3gpp.org/ftp/tsg_ran/wg1_rl1/tsgr1_78b/docs/ [retrived on Oct. 9, 2014], Sections 1 and 2.

* cited by examiner

TECHNIQUES FOR HANDLING BURSTY INTERFERENCE IN A SHARED RADIO FREQUENCY SPECTRUM BAND

CROSS REFERENCES

The present application for patent claims priority to U.S. Provisional Patent Application No. 62/134,336 by Chendamarai Kannan et al., entitled "Techniques for Handling Bursty Interference in a Shared Radio Frequency Spectrum Band," filed Mar. 17, 2015, and U.S. Provisional Patent Application No. 62/080,078 by Chendamarai Kannan et al., entitled "Techniques for Handling Bursty Interference in a Shared Radio Frequency Spectrum Band," filed Nov. 14, 2014, assigned to the assignee hereof, and expressly incorporated by reference herein.

BACKGROUND

Field of the Disclosure

The present disclosure, for example, relates to wireless communication systems, and more particularly to techniques for handling bursty interference in a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Some modes of communication may enable communications between a base station and a UE in a shared radio frequency spectrum band. With increasing data traffic in cellular networks that use a dedicated (e.g., licensed) radio frequency spectrum band, offloading of at least some data traffic to a shared radio frequency spectrum band may provide a cellular operator with opportunities for enhanced data transmission capacity. A shared radio frequency spectrum band may also provide service in areas where access to a dedicated radio frequency spectrum band is unavailable. However, uncoordinated transmissions of heterogeneous types, in a shared radio frequency spectrum band, may lead to nodes operating according to one radio technology in the shared radio frequency spectrum band causing interference for nodes operating according to a second radio technology in the shared radio frequency spectrum band.

SUMMARY

The present disclosure, for example, relates to one or more techniques for handling bursty interference in a shared radio frequency spectrum band. In some scenarios, bursty interference can lead to data loss at a receiving apparatus. Bursty interference that leads to a decoding failure and loss of a code block can cause the receiving apparatus to transmit a negative acknowledgment (NACK), which NACK can lead to loss of an entire transport block. Bursty interference that is not accounted for can additionally or alternatively lead to undesirable effects on outer loop link adaptation (OLLA) by a base station. In some scenarios, bursty interference (or an instance of periodic bursty interference) may subside, but a base station may continue to operate under a reduced modulation and coding scheme (MCS)/rank long after the bursty interference subsides. Operating under a reduced MCS/rank when a higher MCS/rank is supported can be inefficient.

The present disclosure describes a system in which a UE may determine that the UE is exposed to a bursty interference in a shared radio frequency spectrum band and modify, based at least in part on the bursty interference, a feedback message reporting by the UE to a base station. The base station may also determine that the UE is exposed to the bursty interference in the shared radio frequency spectrum band and modify, based at least in part on the bursty interference, one or more of: a link adaptation for the UE or a transmission schedule for the UE.

A method for wireless communication is described. The method may include determining, at a UE, that the UE is exposed to a bursty interference in a shared radio frequency spectrum band. The method may also include modifying, based at least in part on the bursty interference, a feedback message reporting by the UE to a base station.

An apparatus for wireless communication is described. The apparatus may include means for determining, at a UE, that the UE is exposed to a bursty interference in a shared radio frequency spectrum band. The apparatus may also include means for modifying, based at least in part on the bursty interference, a feedback message reporting by the UE to a base station.

A further apparatus for wireless communication is described. The apparatus may include a processor, and memory coupled to the processor. The processor may be configured to determine, at a UE, that the UE is exposed to a bursty interference in a shared radio frequency spectrum band. The processor may also be configured to modify, based at least in part on the bursty interference, a feedback message reporting by the UE to a base station.

A computer-readable medium for storing instructions executable by a processor is described. The instructions may include instructions to determine, at a UE, that the UE is exposed to a bursty interference in a shared radio frequency spectrum band. The instructions may also include instructions to modify, based at least in part on the bursty interference, a feedback message reporting by the UE to a base station.

In some examples of the method, apparatuses, or computer-readable medium described above, determining that the UE is exposed to the bursty interference may include determining that a parameter of the bursty interference satisfies a threshold. In some examples, modifying the feedback message reporting may include withholding reporting of a feedback message based at least in part on the parameter of the bursty interference satisfying the threshold. In some examples, the parameter of the bursty interference may include a strength of the bursty interference or a duration of the bursty interference.

In some examples of the method, apparatuses, or computer-readable medium described above, determining that the UE is exposed to the bursty interference may include determining at least one parameter of the bursty interference, and the at least one parameter of the bursty interference may include one or more of: a strength of the bursty interference; a duration of the bursty interference, a pattern of the bursty interference, a periodicity of the bursty interference, a preamble contained in the bursty interference; a transmission format associated with the bursty interference; or a wireless standard associated with the bursty interference.

In some examples of the method, apparatuses, or computer-readable medium described above, modifying the feedback message reporting may include withholding, based at least in part on the bursty interference, transmission of an ACK/NACK of a downlink transmission. Some examples of the method, apparatuses, or computer-readable medium described above may further include processes, features, means, or instructions for detecting a failure to decode a downlink transmission received during the bursty interference, and modifying the feedback message reporting may include withholding, based at least in part on the bursty interference and the failure to decode the downlink transmission, transmission of an ACK/NACK of the downlink transmission. In some examples of the method, apparatuses, or computer-readable medium described above, modifying the feedback message reporting may include transmitting, with an ACK/NACK of a downlink transmission, an indicator of the bursty interference.

In some examples of the method, apparatuses, or computer-readable medium described above, determining the UE is exposed to bursty interference may include determining at least one parameter of the bursty interference, and modifying the feedback message reporting may include transmitting the at least one parameter of the bursty interference. In some examples of the method, apparatuses, or computer-readable medium described above, the at least one parameter of the bursty interference may include one or more of: a strength of the bursty interference; a duration of the bursty interference; a pattern of the bursty interference; a periodicity of the bursty interference; a preamble contained in the bursty interference; a transmission format associated with the bursty interference; or a wireless standard associated with the bursty interference.

In some examples of the method, apparatuses, or computer-readable medium described above, the at least one parameter of the bursty interference may be transmitted with an ACK/NACK of a downlink transmission. In some examples of the method, apparatuses, or computer-readable medium described above, the at least one parameter of the bursty interference may be transmitted via semi-static signaling.

A method for wireless communication is described. The method may include determining, at a base station, that a UE is exposed to a bursty interference in a shared radio frequency spectrum band. The method may also include modifying, based at least in part on the bursty interference, one or more of: a link adaptation for the UE or a transmission schedule for the UE.

An apparatus for wireless communication is described. The apparatus may include means for determining, at a base station, that a UE is exposed to a bursty interference in a shared radio frequency spectrum band. The apparatus may also include means for modifying, based at least in part on the bursty interference, one or more of: a link adaptation for the UE or a transmission schedule for the UE.

A further apparatus for wireless communication is described. The apparatus may include a processor, and memory coupled to the processor. The processor may be configured to determine, at a base station, that a UE is exposed to a bursty interference in a shared radio frequency spectrum band. The processor may also be configured to modify, based at least in part on the bursty interference, one or more of: a link adaptation for the UE or a transmission schedule for the UE.

A computer-readable medium for storing instructions executable by a processor is described. The instructions may include instructions to determine, at a base station, that a UE is exposed to a bursty interference in a shared radio frequency spectrum band. The instructions may also include instructions to modify, based at least in part on the bursty interference, one or more of: a link adaptation for the UE or a transmission schedule for the UE.

In some examples of the method, apparatuses, or computer-readable medium described above, determining that the UE is exposed to the bursty interference may include detecting a failure to receive, from the UE, an ACK/NACK of a downlink transmission, and modifying the link adaptation for the UE may include foregoing an outer loop link adaptation (OLLA) for the UE based at least in part on the failure to receive the ACK/NACK of the downlink transmission. Some examples of the method, apparatuses, or computer-readable medium described above may further include processes, features, means, or instructions for receiving from the UE an indicator of the bursty interference, and determining that the UE is exposed to the bursty interference may be based at least in part on the indicator of the bursty interference. In some examples of the method, apparatuses, or computer-readable medium described above, modifying the link adaptation for the UE may include foregoing an OLLA for the UE based at least in part on the indicator of the bursty interference.

Some examples of the method, apparatuses, or computer-readable medium described above may further include processes, features, means, or instructions for receiving from the UE at least one parameter of the bursty interference, and determining that the UE is exposed to the bursty interference may be based at least in part on the at least one parameter of the bursty interference. In some examples of the method, apparatuses, or computer-readable medium described above, modifying the link adaptation for the UE may include foregoing an OLLA for the UE based at least in part on the at least one parameter of the bursty interference. In some examples of the method, apparatuses, or computer-readable medium described above, modifying the transmission schedule for the UE may include foregoing a transmission to the UE based at least in part on the at least one parameter of the bursty interference. In some examples of the method, apparatuses, or computer-readable medium described above, the at least one parameter of the bursty interference may include one or more of: a strength of the bursty interference; a duration of the bursty interference; a pattern of the bursty interference; a periodicity of the bursty interference; a preamble contained in the bursty interference; a transmission format associated with the bursty interference; or a wireless standard associated with the bursty interference.

Some examples of the method, apparatuses, or computer-readable medium described above may further include processes, features, means, or instructions for receiving a plurality of indicators of the bursty interference from the UE, and determining at least one parameter of the bursty interference from the plurality of received indicators of the bursty interference. In these examples, determining that the UE is exposed to the bursty interference may be based at least in part on the plurality of indicators of the bursty interference, and the link adaptation for the UE or the transmission schedule for the UE may be modified based at least in part on the at least one parameter of the bursty interference.

In some examples of the method, apparatuses, or computer-readable medium described above, determining that the UE is exposed to the bursty interference may include predicting an occurrence of the bursty interference, and the modifying may be performed for the predicted occurrence of the bursty interference.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If the first reference label is used in the specification, the description is applicable to any one of the similar components having the same first reference label irrespective of the second reference label.

DETAILED DESCRIPTION

Figure 1:
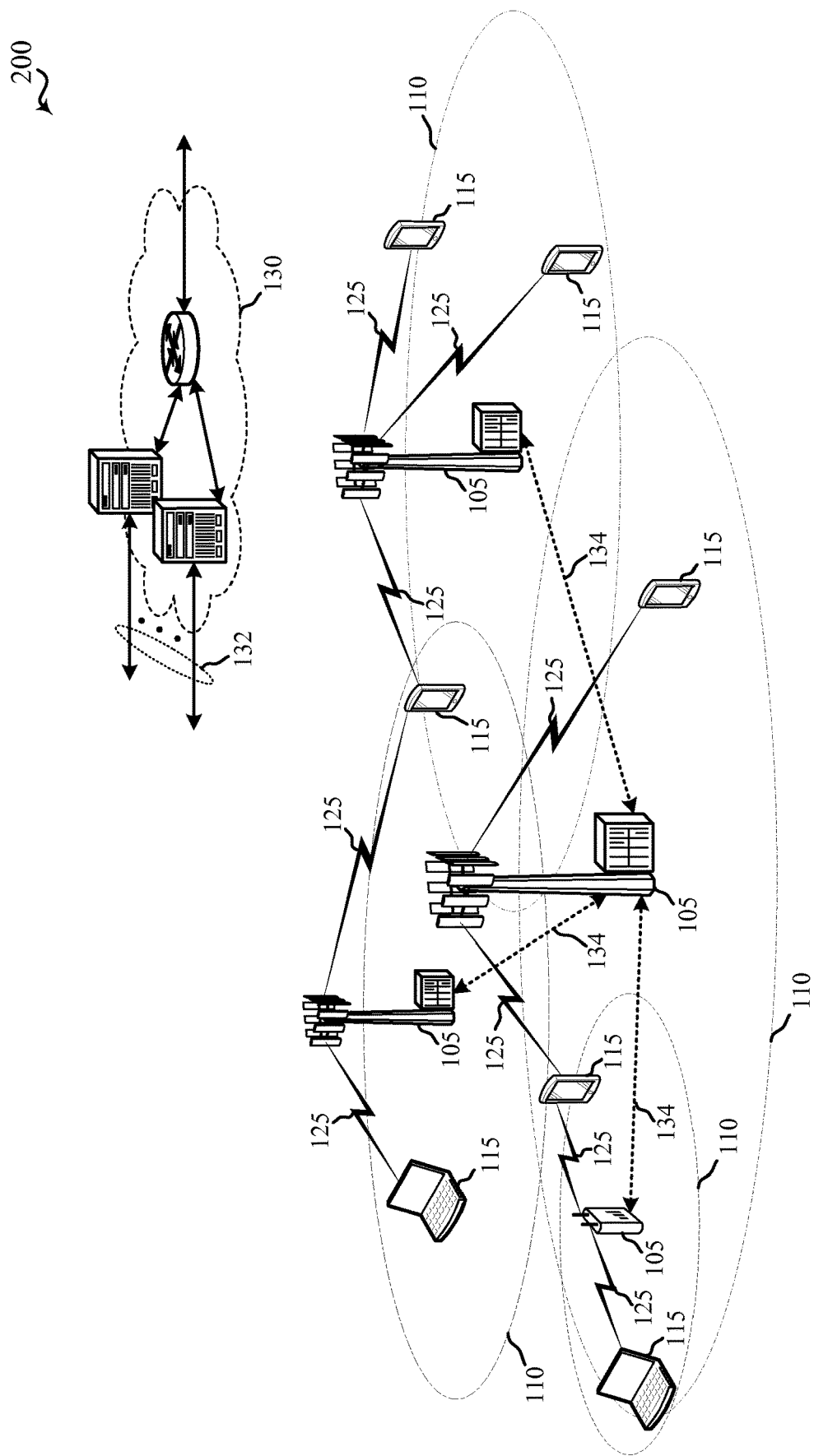
FIG. 1 illustrates an example of a wireless communication system, in accordance with various aspects of the disclosure.

Techniques are described in which a shared radio frequency spectrum band is used for at least a portion of communications over a wireless communication system. In some examples, the shared radio frequency spectrum band may be used for LTE/LTE-A communications. The shared radio frequency spectrum band may be used in combination with, or independent from, a dedicated radio frequency spectrum band. The dedicated radio frequency spectrum band may be a radio frequency spectrum band for which transmitting apparatuses may not contend for access because the radio frequency spectrum band is licensed to particular users, such as a licensed radio frequency spectrum band usable for LTE/LTE-A communications. The shared radio frequency spectrum band may be a radio frequency spectrum band for which a device may need to contend for access (e.g., a radio frequency spectrum band that is available for unlicensed use, such as Wi-Fi use, or a radio frequency spectrum band that is available for use by multiple operators in an equally shared or prioritized manner).

As previously mentioned, bursty interference can lead to data loss at a receiving apparatus or OLLA at a transmitting apparatus (e.g., a base station). Data loss and OLLA events may be mitigated, as described in the present disclosure, by modifying a UE's feedback message reporting based at least in part on bursty interference or by modifying one or more of a base station's link adaptation for the UE or transmission schedule for the UE.

With increasing data traffic in cellular networks that use a dedicated radio frequency spectrum band, offloading of at least some data traffic to a shared radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Use of a shared radio frequency spectrum band may also provide service in areas where access to a dedicated radio frequency spectrum band is unavailable. As noted above, before communicating over a shared radio frequency spectrum band, transmitting apparatuses may perform an LBT procedure to gain access to the medium. Such an LBT procedure may include performing a CCA procedure (or extended CCA procedure) to determine whether a channel of the shared radio frequency spectrum band is available. When it is determined that the channel of the shared radio frequency spectrum band is available, a CUBS may be transmitted to reserve the channel. When it is determined that a channel is not available, a CCA procedure (or extended CCA procedure) may be performed for the channel again at a later time.

The following description provides examples, and is not limiting of the scope, applicability, or examples set forth in the claims. Changes may be made in the function and arrangement of elements mentioned without departing from the scope of the disclosure. Various examples may omit, substitute, or add various procedures or components as appropriate. For an instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid Automatic Repeat Request (HARM) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions. In some examples, DL transmissions may include transmissions of downlink control information (DCI), and UL transmissions may include transmissions of uplink control information (UCI). The DCI may be transmitted over a downlink control channel (e.g., a PDCCH or enhanced PDCCH (ePDCCH)). The DCI may include, for example, acknowledgements (ACKs) or non-acknowledgements (NACKs) of UL transmissions. The UCI may be transmitted over an uplink control channel (e.g., a physical uplink control channel (PUCCH) or enhanced PUCCH (ePUCCH)). The UCI may include, for example, ACKs/NACKs of DL transmissions, or channel state information (CSI).

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Transmissions between a base station 105 and a UE 115 may be made in accordance with one or more transmission parameters, such as a modulation and coding scheme (MCS) or rank. Based at least in part on CSI, the receipt of ACKs or NACKs, or other factors, the transmission parameters used for a UL transmission or DL transmission may be adapted. For example, upon receiving a NACK from a UE 115, a base station 105 may reduce the MCS/rank (e.g., decrement a channel quality indicator (CQI) offset) used for DL transmissions to the UE 115. Upon receiving an ACK from the UE 115, the base station 105 may increment the CQI offset. In some examples, the CQI offset decrement steps may be much larger (e.g., 10× larger) than the CQI offset increment steps.

In some examples, the wireless communication system 100 may support operation over a dedicated radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)). Upon winning a contention for access to the shared radio frequency spectrum band, a transmitting apparatus (e.g., a base station 105 or UE 115) may transmit one or more CUBS over the shared radio frequency spectrum band. The CUBS may reserve the shared radio frequency spectrum by providing a detectable energy on the shared radio frequency spectrum band. The CUBS may also serve to identify the transmitting apparatus or serve to synchronize the transmitting apparatus and a receiving apparatus.

Figure 2:
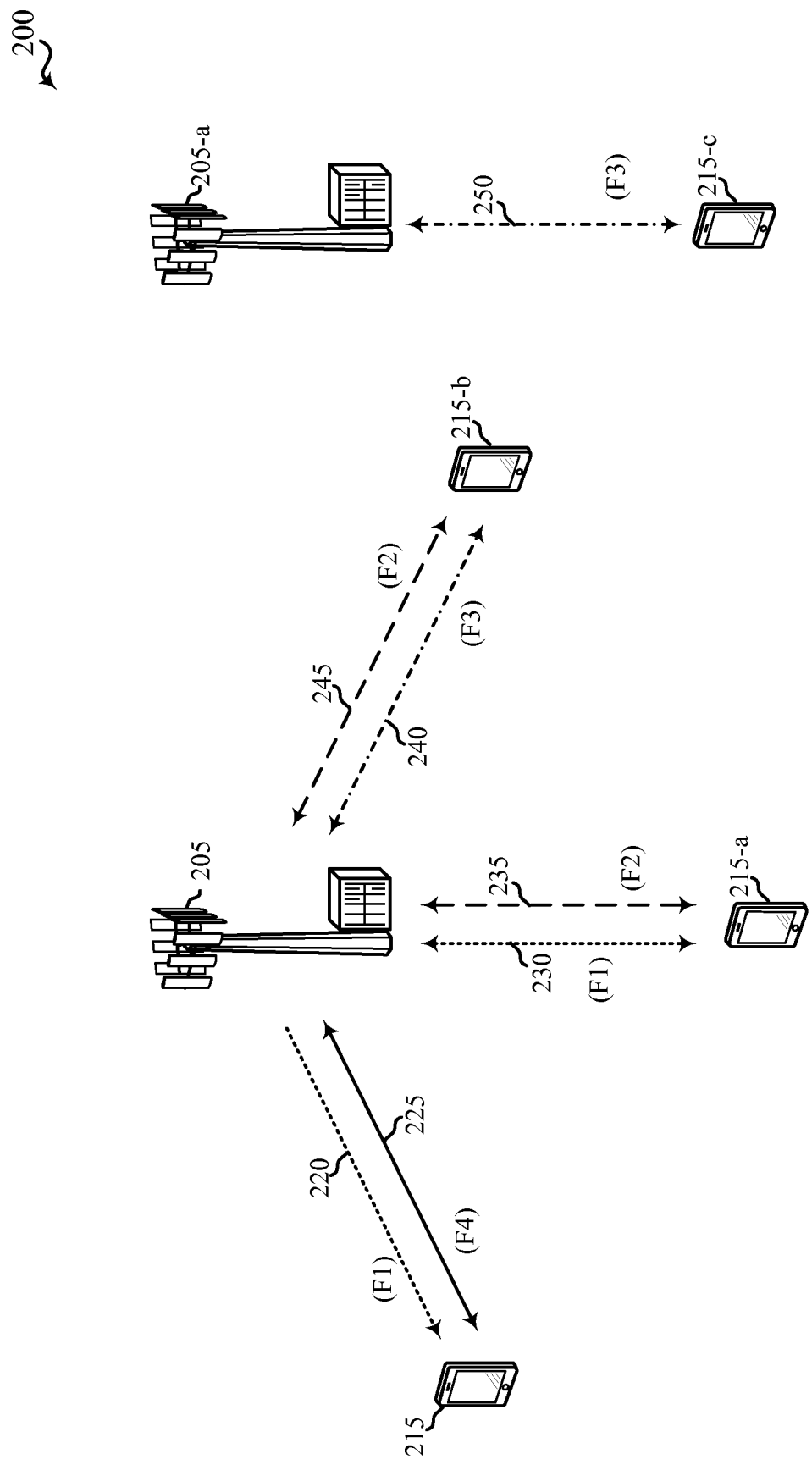
FIG. 2 shows a wireless communication system in which LTE/LTE-A may be deployed under different scenarios using a shared radio frequency spectrum band, in accordance with various aspects of the present disclosure.

FIG. 2 shows a wireless communication system 200 in which LTE/LTE-A may be deployed under different scenarios using a shared radio frequency spectrum band, in accordance with various aspects of the present disclosure. More specifically, FIG. 2 illustrates examples of a supplemental downlink mode (e.g., a licensed assisted access mode), a carrier aggregation mode, and a standalone mode, in which LTE/LTE-A is deployed using a shared radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in a shared radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a dedicated radio frequency spectrum band. The downlink channel 220 in the shared radio frequency spectrum band and the first bidirectional link 225 in the dedicated radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a dedicated radio frequency spectrum and needs to relieve some of the traffic or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, or resource block interleaved FDMA waveforms from the second UE 215-a using the second bidirectional link 230. The second bidirectional link 230 may be associated with the frequency F1 in the shared radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a dedicated radio frequency spectrum band. The second bidirectional link 230 may provide a downlink and uplink capacity offload for the first base station 205. Like the supplemental downlink described above, this scenario may occur with any service provider (e.g., MNO) that uses a dedicated radio frequency spectrum and needs to relieve some of the traffic or signaling congestion.

In another example of a carrier aggregation mode in the wireless communication system 200, the first base station 205 may transmit OFDMA waveforms to the third UE 215-*b* using a fourth bidirectional link 240 and may receive OFDMA waveforms, SC-FDMA waveforms, or resource block interleaved waveforms from the third UE 215-*b* using the fourth bidirectional link 240. The fourth bidirectional link 240 may be associated with a frequency F3 in the shared radio frequency spectrum band. The first base station 205 may also transmit OFDMA waveforms to the third UE 215-*b* using a fifth bidirectional link 245 and may receive SC-FDMA waveforms from the third UE 215-*b* using the fifth bidirectional link 245. The fifth bidirectional link 245 may be associated with the frequency F2 in the dedicated radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a dedicated radio frequency spectrum band and use a shared radio frequency spectrum band for capacity offload.

As described above, one type of service provider that may benefit from the capacity offload offered by using LTE/LTE-A in a shared radio frequency spectrum band is a traditional MNO having access rights to an LTE/LTE-A dedicated radio frequency spectrum band. For these service providers, an operational example may include a bootstrapped mode (e.g., supplemental downlink, carrier aggregation) that uses the LTE/LTE-A primary component carrier (PCC) on the dedicated radio frequency spectrum band and at least one secondary component carrier (SCC) on the shared radio frequency spectrum band.

In the carrier aggregation mode, data and control may, for example, be communicated in the dedicated radio frequency spectrum band (e.g., via first bidirectional link 225, third bidirectional link 235, and fifth bidirectional link 245) while data may, for example, be communicated in the shared radio frequency spectrum band (e.g., via second bidirectional link 230 and fourth bidirectional link 240). The carrier aggregation mechanisms supported when using a shared radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-*a* may transmit OFDMA waveforms to the fourth UE 215-*c* using a bidirectional link 250 and may receive OFDMA waveforms, SC-FDMA waveforms, or resource block interleaved FDMA waveforms from the fourth UE 215-*c* using the bidirectional link 250. The bidirectional link 250 may be associated with the frequency F3 in the shared radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated radio frequency spectrum band.

In some examples, a transmitting apparatus such as one of the base stations 105, 205, or 205-*a* described with reference to FIG. 1 or 2, or one of the UEs 115, 215, 215-*a*, 215-*b*, or 215-*c* described with reference to FIG. 1 or 2, may use a gating interval to gain access to a channel of a shared radio frequency spectrum band (e.g., to a physical channel of the shared radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based at least in part on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The CCA procedure may involve listening to a channel of a shared radio frequency spectrum band, to assess whether an energy on the channel satisfies a threshold. The outcome of the CCA procedure may indicate to the transmitting apparatus whether the channel of the shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
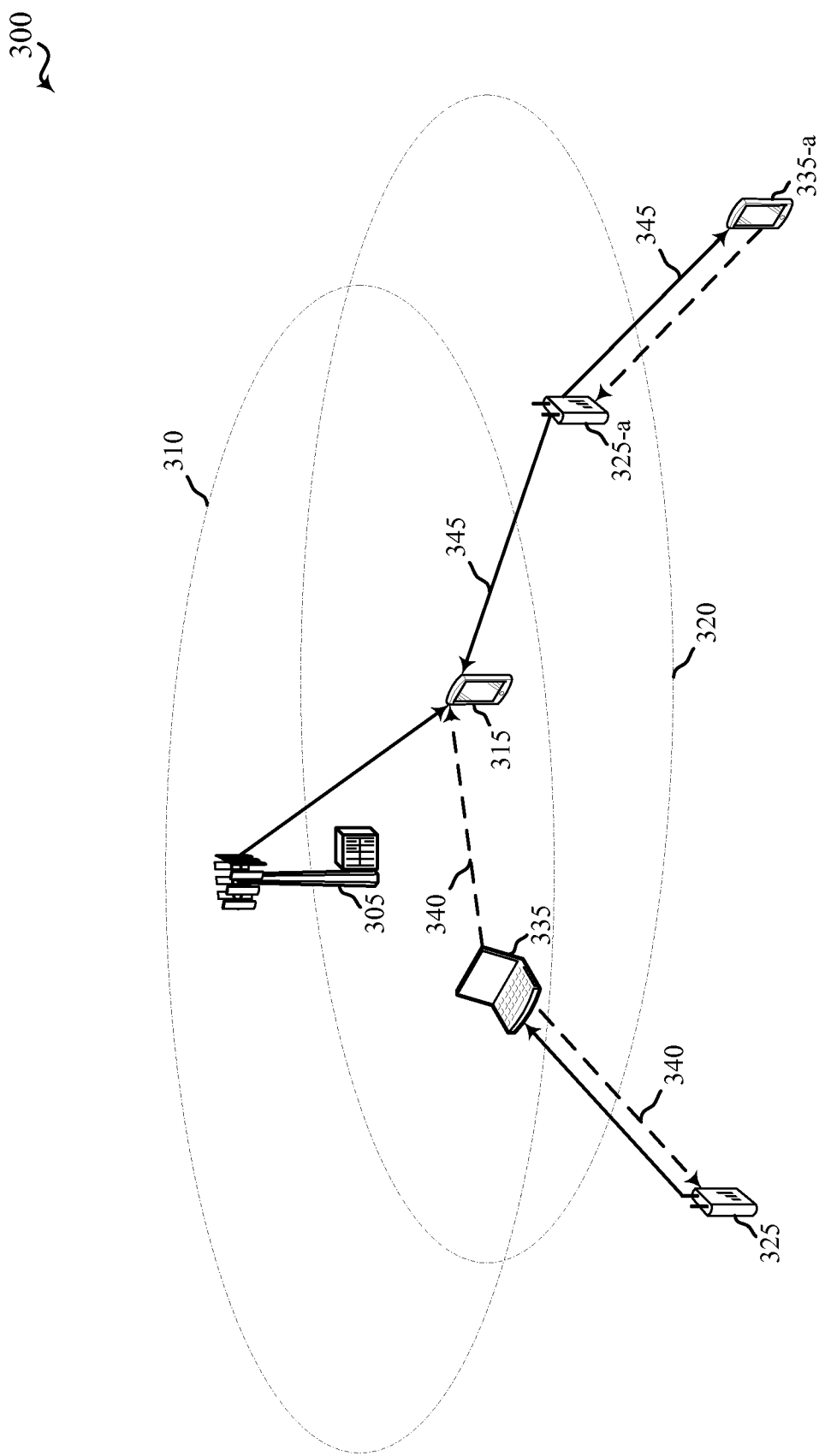
FIG. 3 illustrates an example of a wireless communication system, in accordance with various aspects of the disclosure.

FIG. 3 illustrates an example of a wireless communication system 300, in accordance with various aspects of the disclosure. The wireless communication system 300 may include one or more base stations 305, UEs 315, Wi-Fi access points (APs) (e.g., a first Wi-Fi AP 325 and a second Wi-Fi AP 325-*a*), or Wi-Fi stations (e.g., a first Wi-Fi station 335, and a second Wi-Fi station 335-*a*). The base station 305 may be an example of aspects of one or more of the base stations 105, 205, or 205-*a* described with reference to FIG. 1 or 2, and the UE 315 may be an example of aspects of one or more of the UEs 115, 215, 215-*a*, 215-*b*, or 215-*c* described with reference to FIG. 1 or 2. In some examples, the base station 305 and the UE 315 may be LTE/LTE-A nodes that communicate in a shared radio frequency spectrum band (e.g., a radio frequency spectrum band shared by LTE/LTE-A nodes and Wi-Fi nodes).

The base station 305 may have a transmission range 310 and may operate as a serving cell for the UE 315. The UE 315 may have a reception range 320. When the base station 305 performs a CCA procedure, there may be nodes (e.g., the first Wi-Fi AP 325, the second Wi-Fi AP 325-*a*, or the second Wi-Fi station 335-*a*) that are not detected by the base station 305 (e.g., because their transmission energies are undetectable by the base station 305, or because their transmission energies do not exceed a threshold). Similarly, when the UE 315 performs a CCA procedure, there may be nodes (e.g., the first Wi-Fi AP 325 or the second Wi-Fi station 335-*a*) that are not detected by the UE 315.

When the base station 305 transmits to the UE 315, the UE's reception of a DL transmission 330 from the base station 305 may be interfered with by a first Wi-Fi transmission (or transmissions) 340 of the first Wi-Fi station 335 or a second Wi-Fi transmission (or transmissions) 345 of the second Wi-Fi AP 325-*a*. Although transmission energy of the first Wi-Fi station 335 may be detectable by the base station 305, it is possible that the first Wi-Fi station 335 may not be transmitting when the base station 305 performs a CCA procedure, but may respond to the first Wi-Fi AP 325

(i.e., transmit) at a time that overlaps part or all of a DL transmission from the base station 305 to the UE 315. Similarly, a transmission by the second Wi-Fi AP 325-*a* may overlap part or all of a DL transmission from the base station 305 to the UE 315.

In some examples, the predominant component of the first Wi-Fi transmission(s) 340 may be Wi-Fi ACK/NACK transmissions. Wi-Fi ACK/NACK transmissions may have durations in the range of 50-120 microseconds (μs) and may interfere with the reception of 1-3 LTE/LTE-A OFDM symbols in the shared radio frequency spectrum band. The first Wi-Fi transmission(s) 340 may therefore appear as bursty interference to the UE 315. In some examples, the predominant component of the second Wi-Fi transmission(s) 345 may be data transmissions, and the second Wi-Fi transmission(s) 345 may be received at the UE 315 as persistent interference.

In the time domain, the transmission of short Wi-Fi data/control packets may also appear as bursty interference to the UE 315, and may interfere with the reception of a few LTE/LTE-A OFDM symbols in the shared radio frequency spectrum band. The transmission of longer Wi-Fi data packets may appear as persistent interference to the UE 315, and may interfere with the reception of multiple LTE/LTE-A subframes. In the frequency domain, Wi-Fi transmissions such as IEEE 802.11n transmissions or IEEE 802.11ac transmissions may occupy a wider band (e.g., the transmissions may have a minimum bandwidth of 20 MHz), whereas Wi-Fi transmissions such as IEEE 802.11 ax transmissions may occupy a narrower band (e.g., 5 MHz).

Transmissions in the shared radio frequency spectrum band may also interfere with the reception of UL transmissions at the base station 305, and in some examples may appear as bursty interference to the base station 305. Although the bursty interference described with reference to FIG. 3 is caused by Wi-Fi transmissions, bursty interference may also be caused by other types of transmissions, such as ultra-low latency (ULL) transmissions and enhanced component carrier (eCC) transmissions. More generally, bursty interference may be present in any wireless communication system in which uncoordinated transmissions of heterogeneous types are made.

Bursty interference can lead to data loss at a receiving apparatus. In some examples, bursty interference that leads to a decoding failure and loss of a code block can cause the receiving apparatus to transmit a NACK, which can lead to the loss of an entire transport block. Bursty interference that is not accounted for can lead to outer loop link adaptation (OLLA) by a base station. As previously mentioned, CQI offset decrement steps may be much larger than CQI offset increment steps. Thus, bursty interference (or an instance of periodic bursty interference) may subside, but a base station may continue to operate under a reduced MCS/rank long after the bursty interference subsides. Operating under a reduced MCS/rank when a higher MCS/rank is supported can be inefficient.

Figure 4:
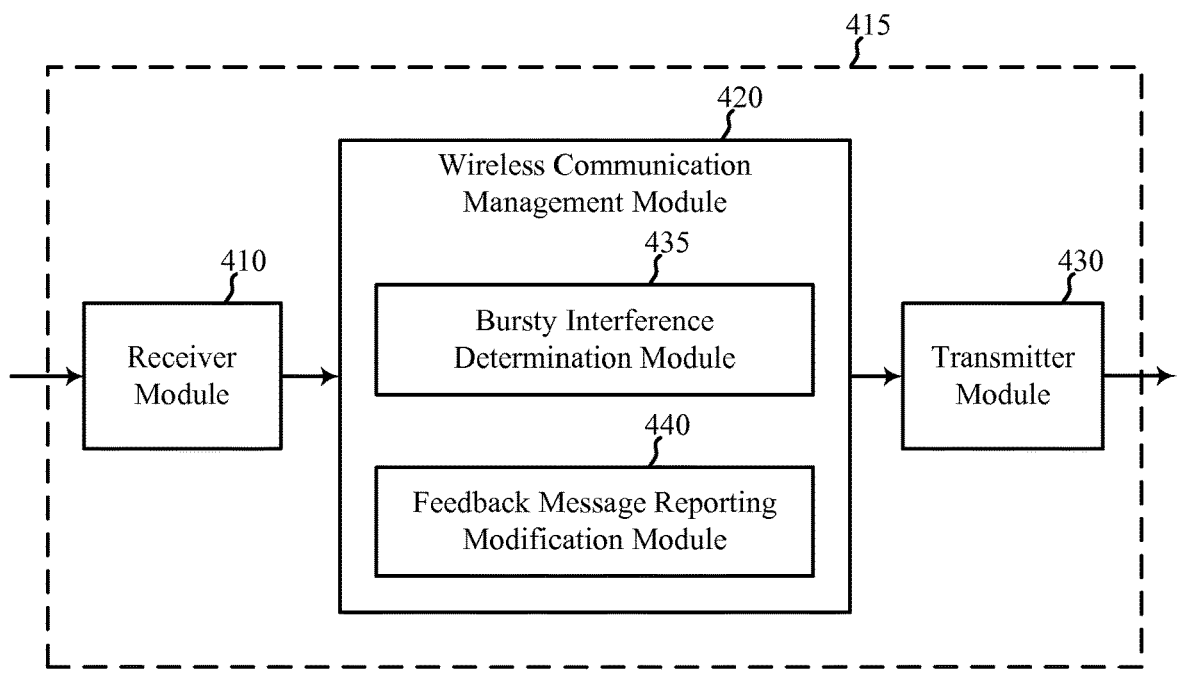
FIG. 4 shows a block diagram of an apparatus for use in wireless communication, in accordance with various aspects of the present disclosure.

FIG. 4 shows a block diagram 400 of an apparatus 415 for use in wireless communication, in accordance with various aspects of the present disclosure. The apparatus 415 may be an example of aspects of one or more of the UEs 115, 215, 215-*a*, 215-*b*, 215-*c*, or 315 described with reference to FIG. 1, 2, or 3. The apparatus 415 may also be or include a processor. The apparatus 415 may include a receiver module 410, a wireless communication management module 420, or a transmitter module 430. Each of these modules may be in communication with each other.

The modules of the apparatus 415 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 410 may include at least one radio frequency (RF) receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, or 3. The receiver module 410 may be used to receive various types of data or control signals (i.e., transmissions) over one or more communication links of a wireless communication system, such as one or more communication links of the wireless communication system 100, 200, or 300 described with reference to FIG. 1, 2, or 3. The communication links may be established over the first radio frequency spectrum band or the second radio frequency spectrum band.

In some examples, the transmitter module 430 may include at least one RF transmitter, such as at least one RF transmitter operable to transmit over the dedicated radio frequency spectrum band or the shared radio frequency spectrum band. The transmitter module 430 may be used to transmit various types of data or control signals (i.e., transmissions) over one or more communication links of a wireless communication system, such as one or more communication links of the wireless communication system 100, 200, or 300 described with reference to FIG. 1, 2, or 3. The communication links may be established over the dedicated radio frequency spectrum band or the shared radio frequency spectrum band.

In some examples, the wireless communication management module 420 may be used to manage one or more aspects of wireless communication for the apparatus 415. In some examples, the wireless communication management module 420 may include a bursty interference determination module 435 or a feedback message reporting modification module 440.

In some examples, the bursty interference determination module 435 may be used to determine that a UE including the apparatus 415 is exposed to a bursty interference in the shared radio frequency spectrum band. In some examples, the feedback message reporting modification module 440 may be used to modify, based at least in part on the bursty interference, a feedback message reporting by the UE to a base station.

Figure 5:
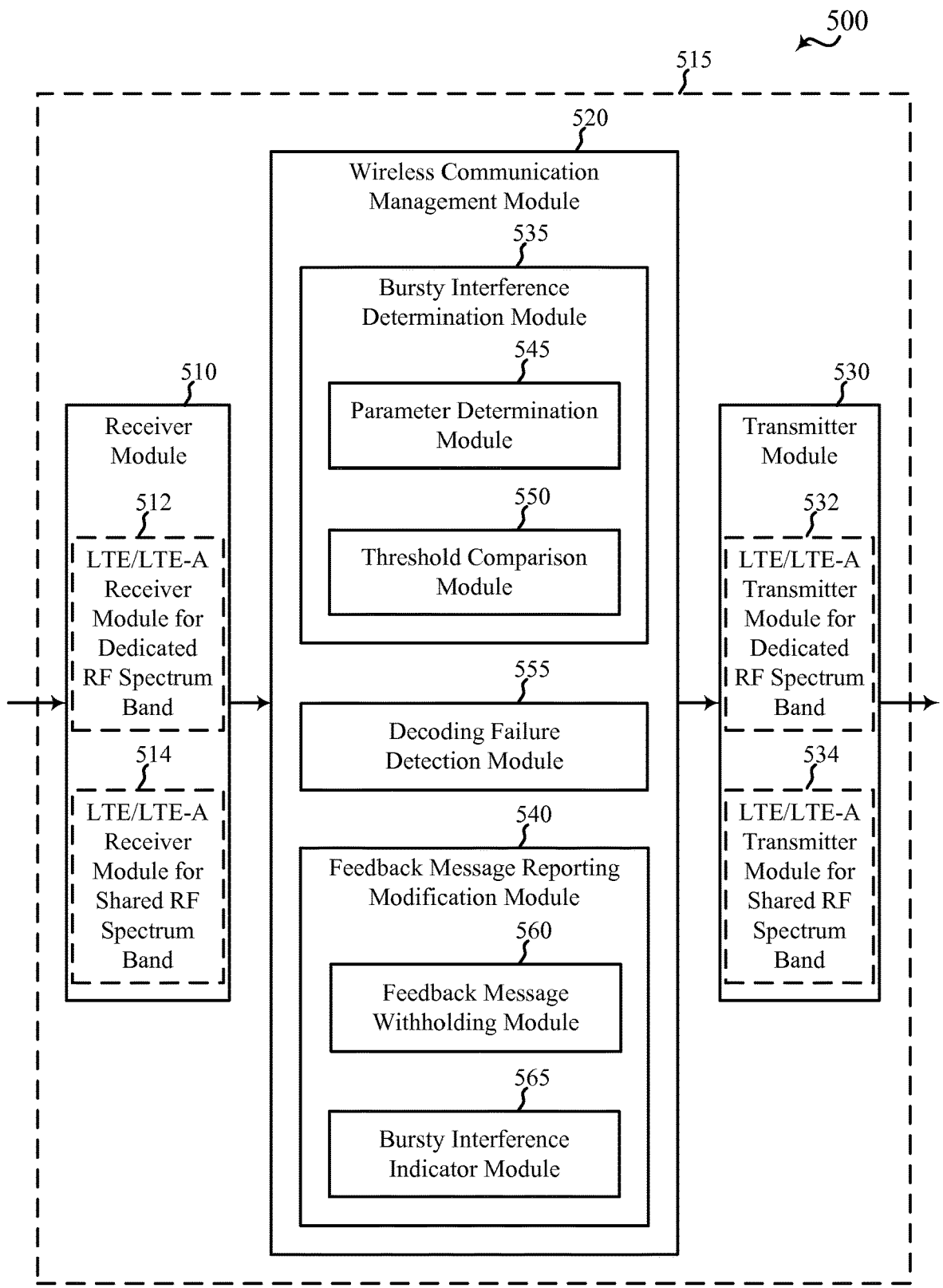
FIG. 5 shows a block diagram of an apparatus for use in wireless communication, in accordance with various aspects of the present disclosure.

FIG. 5 shows a block diagram 500 of an apparatus 515 for use in wireless communication, in accordance with various aspects of the present disclosure. The apparatus 515 may be an example of aspects of one or more of the UEs 115, 215, 215-a, 215-b, 215-c, or 315 described with reference to FIG. 1, 2, or 3, or aspects of the apparatus 415 described with reference to FIG. 4. The apparatus 515 may also be or include a processor. The apparatus 515 may include a receiver module 510, a wireless communication management module 520, or a transmitter module 530. Each of these modules may be in communication with each other.

The modules of the apparatus 515 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 510 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, or 3.

The receiver module 510 may in some cases include separate receivers for the dedicated radio frequency spectrum band and the shared radio frequency spectrum band. The separate receivers may, in some examples, take the form of an LTE/LTE-A receiver module for communicating over the dedicated radio frequency spectrum band (e.g., LTE/LTE-A receiver module for dedicated RF spectrum band 512), and an LTE/LTE-A receiver module for communicating over the shared radio frequency spectrum band (e.g., LTE/LTE-A receiver module for shared RF spectrum band 514). The receiver module 510, including the LTE/LTE-A receiver module for dedicated RF spectrum band 512 or the LTE/LTE-A receiver module for shared RF spectrum band 514, may be used to receive various types of data or control signals (i.e., transmissions) over one or more communication links of a wireless communication system, such as one or more communication links of the wireless communication system 100, 200, or 300 described with reference to FIG. 1, 2, or 3. The communication links may be established over the dedicated radio frequency spectrum band or the shared radio frequency spectrum band.

In some examples, the transmitter module 530 may include at least one RF transmitter, such as at least one RF transmitter operable to transmit over the dedicated radio frequency spectrum band or the shared radio frequency spectrum band. The transmitter module 530 may in some cases include separate transmitters for the dedicated radio frequency spectrum band and the shared radio frequency spectrum band. The separate transmitters may, in some examples, take the form of an LTE/LTE-A transmitter module for communicating over the dedicated radio frequency spectrum band (e.g., LTE/LTE-A transmitter module for dedicated RF spectrum band 532), and an LTE/LTE-A transmitter module for communicating over the shared radio frequency spectrum band (e.g., LTE/LTE-A transmitter module for shared RF spectrum band 534). The transmitter module 530, including the LTE/LTE-A transmitter module for dedicated RF spectrum band 532 or the LTE/LTE-A transmitter module for shared RF spectrum band 534, may be used to transmit various types of data or control signals (i.e., transmissions) over one or more communication links of a wireless communication system, such as one or more communication links of the wireless communication system 100, 200, or 300 described with reference to FIG. 1, 2, or 3. The communication links may be established over the dedicated radio frequency spectrum band or the shared radio frequency spectrum band.

In some examples, the wireless communication management module 520 may be used to manage one or more aspects of wireless communication for the apparatus 515. In some examples, the wireless communication management module 520 may include a bursty interference determination module 535, a decoding failure detection module 555, or a feedback message reporting modification module 540.

In some examples, the bursty interference determination module 535 may be used to determine that a UE including the apparatus 515 is exposed to a bursty interference in the shared radio frequency spectrum band. The bursty interference determination module 535 may include a parameter determination module 545 or a threshold comparison module 550. In some examples, the parameter determination module 545 may be used to determine that the UE is exposed to a bursty interference by determining at least one parameter of the bursty interference. In some examples, the at least one parameter of the bursty interference may include one or more of: a strength of the bursty interference, a duration of the bursty interference; a pattern of the bursty interference; a periodicity of the bursty interference; a preamble (e.g., a Wi-Fi preamble) contained in the bursty interference; a transmission format associated with the bursty interference (e.g., a format used for an ACK, NACK, Request to Send (RTS), or Clear to Send (CTS) transmission); or a wireless standard (e.g., a Wi-Fi standard) associated with the bursty interference. In some examples, part or all of a received packet header may be decoded to determine one or more parameters.

In some examples, the threshold comparison module 550 may compare a parameter determined by the parameter determination module 545 (e.g., the strength of the bursty interference or the duration of the bursty interference) to a threshold, to determine whether the parameter satisfies the threshold. In these examples, the bursty interference determination module 535 may determine that the UE is exposed to a bursty interference by determining that the parameter of the bursty interference satisfies the threshold (or by determining that a plurality of parameters of the bursty interference satisfy respective thresholds). In some examples, the decoding failure detection module 555 may be used to detect a failure to decode a downlink transmission received during the bursty interference.

In some examples, the feedback message reporting modification module 540 may be used to modify, based at least in part on the bursty interference, a feedback message reporting by the UE to a base station. The feedback message reporting modification module 540 may include a feedback message withholding module 560, or a bursty interference indicator module 565.

In some examples, the feedback message withholding module 560 may be used to withhold, based at least in part on the bursty interference, a transmission of an ACK/NACK of a downlink transmission (e.g., a downlink transmission received by the apparatus 515 during the bursty interference). In some examples, the feedback message withholding module 560 may be used to withhold reporting of a feedback message (e.g., transmission of an ACK/NAK) based at least in part on a parameter of the bursty interference satisfying a threshold. In some examples, the feedback message withholding module 560 may be used to withhold, based at least in part on the bursty interference and a failure to decode the downlink transmission, transmission of an ACK/NACK of a downlink transmission (e.g., a downlink transmission received by the apparatus 515 during the bursty interference). In some examples, the bursty interference indicator module 565 may be used to transmit, with an ACK/NACK of a downlink transmission, an indicator of the bursty interference.

In some examples, the bursty interference parameter reporting module 565 may be used to transmit at least one parameter of the bursty interference (as determined by the parameter determination module 545). In some examples, the at least one parameter of the bursty interference may be transmitted with an ACK/NACK of a downlink transmission. In some examples, the at least one parameter of the bursty interference may be transmitted via semi-static signaling, upon request of a base station, upon a trigger event (e.g., a confidence level), or at a slower rate than may occur when transmitting the at least one parameter of the bursty interference with an ACK/NACK of a downlink transmission. In some examples, aspects of the apparatuses 415 and 515 described with reference to FIGS. 4 and 5 may be combined.

Figure 6:
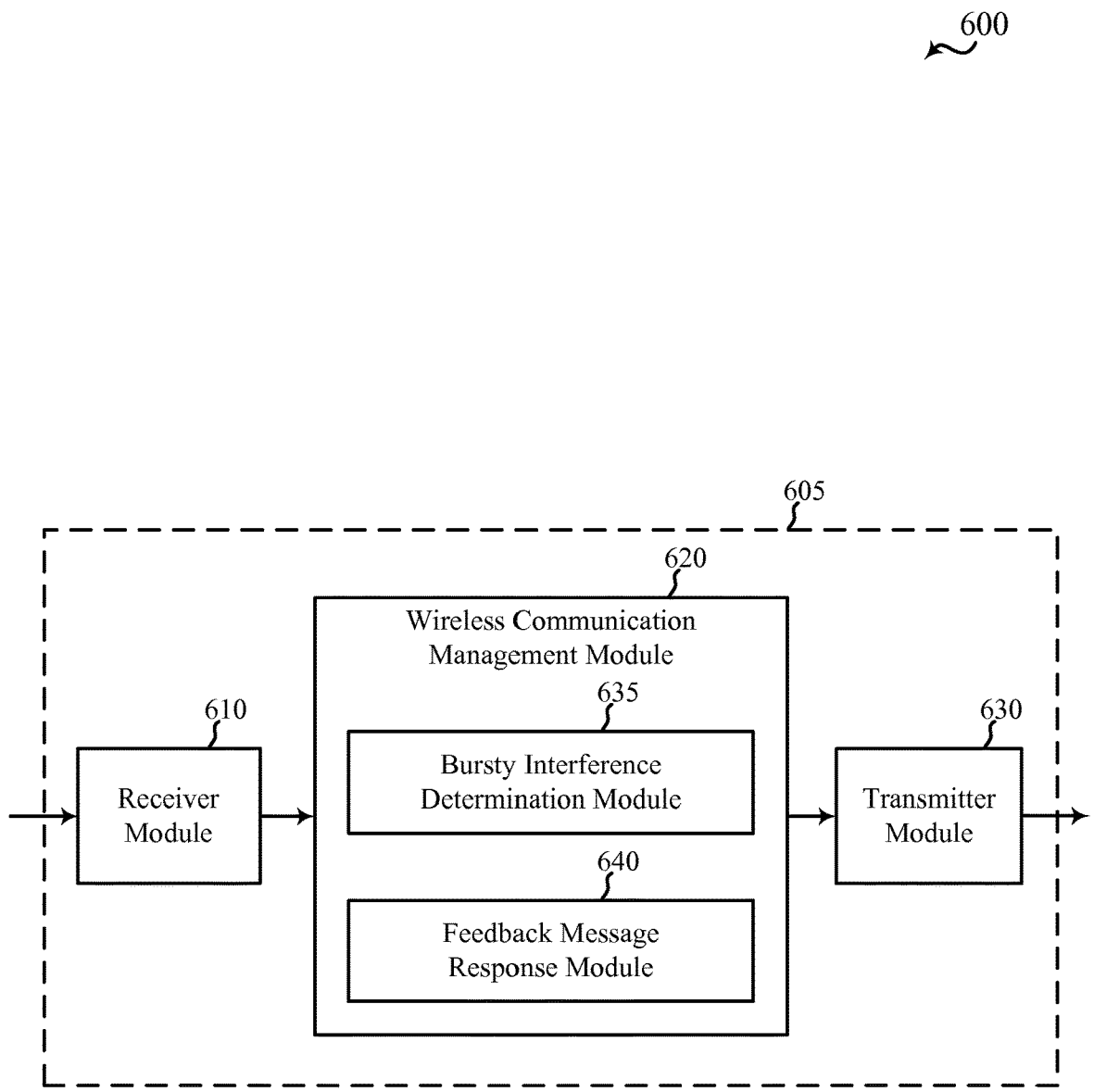
FIG. 6 shows a block diagram of an apparatus for use in wireless communication, in accordance with various aspects of the present disclosure.

FIG. 6 shows a block diagram 600 of an apparatus 605 for use in wireless communication, in accordance with various aspects of the present disclosure. The apparatus 605 may be an example of aspects of one or more of the base stations 105, 205, 205-a, or 305 described with reference to FIG. 1, 2, or 3. The apparatus 605 may also be or include a processor. The apparatus 605 may include a receiver module 610, a wireless communication management module 620, or a transmitter module 630. Each of these modules may be in communication with each other.

The modules of the apparatus 605 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 610 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, or 3. The receiver module 610 may be used to receive various types of data or control signals (i.e., transmissions) over one or more communication links of a wireless communication system, such as one or more communication links of the wireless communication system 100, 200, or 300 described with reference to FIG. 1, 2, or 3. The communication links may be established over the first radio frequency spectrum band or the second radio frequency spectrum band.

In some examples, the transmitter module 630 may include at least one RF transmitter, such as at least one RF transmitter operable to transmit over the dedicated radio frequency spectrum band or the shared radio frequency spectrum band. The transmitter module 630 may be used to transmit various types of data or control signals (i.e., transmissions) over one or more communication links of a wireless communication system, such as one or more communication links of the wireless communication system 100, 200, or 300 described with reference to FIG. 1, 2, or 3. The communication links may be established over the dedicated radio frequency spectrum band or the shared radio frequency spectrum band.

In some examples, the wireless communication management module 620 may be used to manage one or more aspects of wireless communication for the apparatus 605. In some examples, the wireless communication management module 620 may include a bursty interference determination module 635 or a feedback message response module 640.

In some examples, the bursty interference determination module 635 may be used to determine, at a base station including the apparatus 605, that a UE is exposed to a bursty interference in the shared radio frequency spectrum band. In some examples, the feedback message reporting modification module 440 may be used to modify, based at least in part on the bursty interference, one or more of: a link adaptation for the UE or a transmission schedule for the UE.

Figure 7:
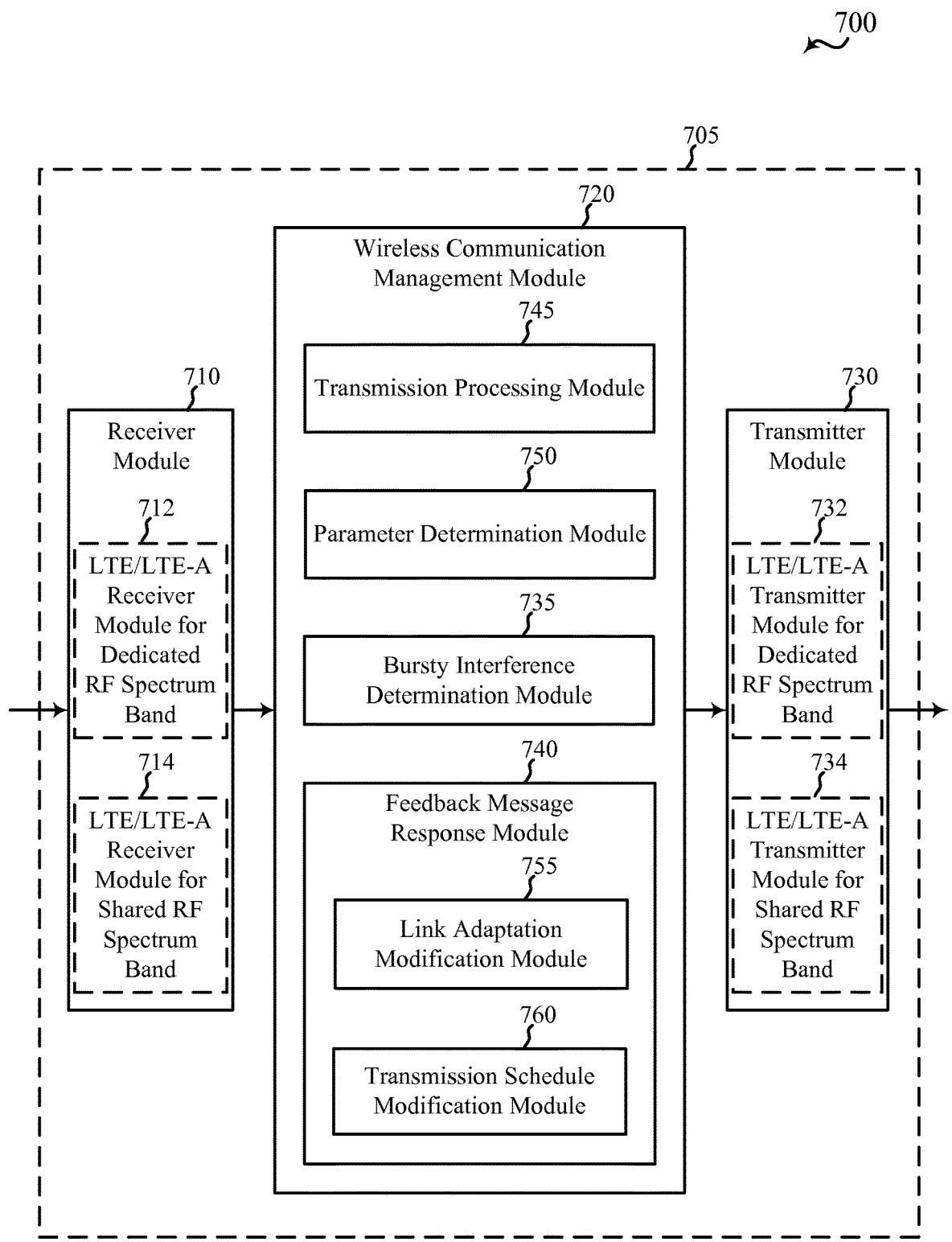
FIG. 7 shows a block diagram of an apparatus for use in wireless communication, in accordance with various aspects of the present disclosure.

FIG. 7 shows a block diagram 700 of an apparatus 705 for use in wireless communication, in accordance with various aspects of the present disclosure. The apparatus 705 may be an example of aspects of one or more of the base stations 105, 205, 205-a, or 305 described with reference to FIG. 1, 2, or 3, or aspects of the apparatus 605 described with reference to FIG. 6. The apparatus 705 may also be or include a processor. The apparatus 705 may include a receiver module 710, a wireless communication management module 720, or a transmitter module 730. Each of these modules may be in communication with each other.

The modules of the apparatus 705 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 710 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, or 3.

The receiver module 710 may in some cases include separate receivers for the dedicated radio frequency spectrum band and the shared radio frequency spectrum band. The separate receivers may, in some examples, take the form of an LTE/LTE-A receiver module for communicating over the dedicated radio frequency spectrum band (e.g., LTE/LTE-A receiver module for dedicated RF spectrum band 712), and an LTE/LTE-A receiver module for communicating over the shared radio frequency spectrum band (e.g., LTE/LTE-A receiver module for shared RF spectrum band 714). The receiver module 710, including the LTE/LTE-A receiver module for dedicated RF spectrum band 712 or the LTE/LTE-A receiver module for shared RF spectrum band 714, may be used to receive various types of data or control signals (i.e., transmissions) over one or more communication links of a wireless communication system, such as one or more communication links of the wireless communication system 100, 200, or 300 described with reference to FIG. 1, 2, or 3. The communication links may be established over the dedicated radio frequency spectrum band or the shared radio frequency spectrum band.

In some examples, the transmitter module 730 may include at least one RF transmitter, such as at least one RF transmitter operable to transmit over the dedicated radio frequency spectrum band or the shared radio frequency spectrum band. The transmitter module 730 may in some cases include separate transmitters for the dedicated radio frequency spectrum band and the shared radio frequency spectrum band. The separate transmitters may, in some examples, take the form of an LTE/LTE-A transmitter module for communicating over the dedicated radio frequency spectrum band (e.g., LTE/LTE-A transmitter module for dedicated RF spectrum band 732), and an LTE/LTE-A transmitter module for communicating over the shared radio frequency spectrum band (e.g., LTE/LTE-A transmitter module for shared RF spectrum band 734). The transmitter module 730, including the LTE/LTE-A transmitter module for dedicated RF spectrum band 732 or the LTE/LTE-A transmitter module for shared RF spectrum band 734, may be used to transmit various types of data or control signals (i.e., transmissions) over one or more communication links of a wireless communication system, such as one or more communication links of the wireless communication system 100, 200, or 300 described with reference to FIG. 1, 2, or 3. The communication links may be established over the dedicated radio frequency spectrum band or the shared radio frequency spectrum band.

In some examples, the wireless communication management module 720 may be used to manage one or more aspects of wireless communication for the apparatus 705. In some examples, the wireless communication management module 720 may include a UE transmission processing module 745, a parameter determination module 750, a bursty interference determination module 735, or a feedback message response module 740.

In some examples, the UE transmission processing module 745 may be used to receive from a UE, at a base station including the apparatus 705, at least one indicator of bursty interference in a shared radio frequency spectrum, or at least one parameter of the bursty interference.

In some examples, the parameter determination module 750 may be used to determine at least one parameter of the bursty interference from a plurality of received indicators of the bursty interference. In some examples, the at least one parameter of the bursty interference received by UE transmission processing module 745, or the at least one parameter of the bursty interference determined by the parameter determination module 750, may include one or more of: a strength of the bursty interference, a duration of the bursty interference; a pattern of the bursty interference; a periodicity of the bursty interference; a preamble (e.g., a Wi-Fi preamble) contained in the bursty interference; a transmission format associated with the bursty interference (e.g., a format used for an ACK, NACK, RTS, or CTS transmission); or a wireless standard (e.g., a Wi-Fi standard) associated with the bursty interference. In some examples, part or all of a received packet header may be decoded to determine one or more parameters.

In some examples, the bursty interference determination module 735 may be used to determine, at the base station including the apparatus 705, that the UE is exposed to a bursty interference in the shared radio frequency spectrum band. In some examples, determining that the UE is exposed to the bursty interference may include detecting a failure to receive, from the UE, an ACK/NACK of a downlink transmission. In some examples, a determination that the UE is exposed to the bursty interference may be based at least in part on receiving, from the UE, an indicator of the bursty interference (or a plurality of indicators of the bursty interference) from the UE. In some examples, a determination that the UE is exposed to the bursty interference may be based at least in part on receiving, from the UE, at least one parameter of the bursty interference. In some examples, determining that the UE is exposed to the bursty interference may include predicting an occurrence of the bursty interference (e.g., based at least in part on at least one received or determined parameter of the bursty interference).

In some examples, the feedback message response module 740 may be used to modify, based at least in part on the bursty interference, one or more of: a link adaptation for the UE or a transmission schedule for the UE. In some examples, the modifying may be performed for a predicted occurrence of the bursty interference. The feedback message response module 740 may include a link adaptation modification module 755 or a transmission schedule modification module 760. In some examples, the link adaptation modification module 755 may be used to modify a link adaptation for the UE. In some examples, modifying the link adaption for the UE may include foregoing (e.g., temporarily freezing or preventing modification of) an OLLA for the UE. In some examples, foregoing the OLLA for the UE may be based at least in part on a failure to receive an ACK/NACK of a downlink transmission, based at least in part on at least one indicator of the bursty interference received from the UE, or based at least in part on at least one parameter of the bursty interference.

In some examples, the transmission schedule modification module 760 may be used to modify a transmission schedule for the UE. In some examples, modifying the transmission schedule for the UE may include foregoing a transmission to the UE, not scheduling the UE in subframes during which bursty interference is predicted, or scheduling the UE with a reduced MCS or rank in a subframe during which bursty interference is predicted. In some examples, foregoing the transmission to the UE may be based at least in part on at least one indicator of the bursty interference or at least one parameter of the bursty interference. In some examples, there may be a direct causal relationship between receipt or determination of an indicator or parameter of the bursty interference and modification of the transmission schedule for the UE (e.g., upon receipt of an indicator of the bursty interference, a next transmission to the UE may be foregone). In some examples, there may be an indirect causal relationship between receipt or determination of an indicator or parameter of the bursty interference and modification of the transmission schedule for the UE (e.g., at least one transmission to the UE may be foregone based at least in part on an anticipated pattern or periodicity of the bursty interference). In some examples, aspects of the apparatuses 605 and 705 described with reference to FIGS. 6 and 7 may be combined.

Figure 8:
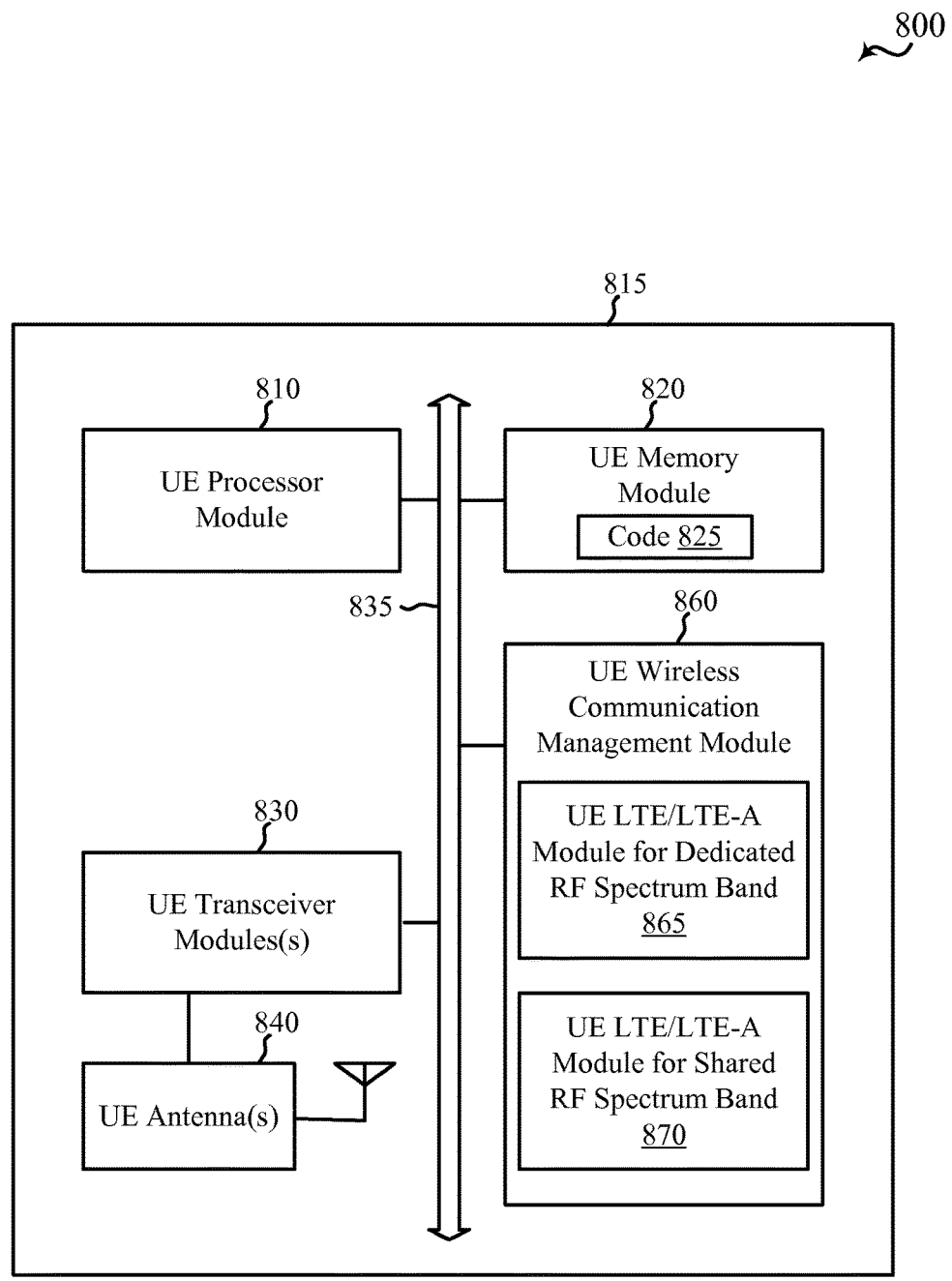
FIG. 8 shows a block diagram of a UE for use in wireless communication, in accordance with various aspects of the present disclosure.

FIG. 8 shows a block diagram 800 of a UE 815 for use in wireless communication, in accordance with various aspects of the present disclosure. The UE 815 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 815 may, in some examples, have an internal power supply (not shown), such as a small battery, to facilitate mobile operation. In some examples, the UE 815 may be an example of aspects of one or more of the UE 115, 215, 215-*a*, 215-*b*, 215-*c*, or 315 described with reference to FIG. 1, 2, or 3, or aspects of one or more of the apparatuses 415 or 515 described with reference to FIG. 4 or 5. The UE 815 may be configured to implement at least some of the UE or apparatus features and functions described with reference to FIG. 1, 2, 3, 4, or 5.

The UE 815 may include a UE processor module 810, a UE memory module 820, at least one UE transceiver module (represented by UE transceiver module(s) 830), at least one UE antenna (represented by UE antenna(s) 840), or a UE wireless communication management module 860. Each of these components may be in communication with each other, directly or indirectly, over one or more buses 835.

The UE memory module 820 may include random access memory (RAM) or read-only memory (ROM). The UE memory module 820 may store computer-readable, computer-executable code 825 containing instructions that are configured to, when executed, cause the UE processor module 810 to perform various functions described herein related to wireless communication, including, for example, determining that the UE is exposed to bursty interference and modifying a feedback message reporting based at least in part on the bursty interference. Alternatively, the code 825 may not be directly executable by the UE processor module 810 but be configured to cause the UE 815 (e.g., when compiled and executed) to perform various of the functions described herein.

The UE processor module 810 may include an intelligent hardware device, e.g., a central processing unit (CPU), a microcontroller, an ASIC, etc. The UE processor module 810 may process information received through the UE transceiver module(s) 830 or information to be sent to the UE transceiver module(s) 830 for transmission through the UE antenna(s) 840. The UE processor module 810 may handle, alone or in connection with the UE wireless communication management module 860, various aspects of communicating over (or managing communications over) a dedicated radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)).

The UE transceiver module(s) 830 may include a modem configured to modulate packets and provide the modulated packets to the UE antenna(s) 840 for transmission, and to demodulate packets received from the UE antenna(s) 840. The UE transceiver module(s) 830 may, in some examples, be implemented as one or more UE transmitter modules and one or more separate UE receiver modules. The UE transceiver module(s) 830 may support communications in the licensed radio frequency spectrum band or the unlicensed radio frequency spectrum band. The UE transceiver module(s) 830 may be configured to communicate bi-directionally, via the UE antenna(s) 840, with one or more of the base stations 105, 205, 205-*a*, or 305 described with reference to FIG. 1, 2, or 3, or the apparatus 605 or 705 described with reference to FIG. 6 or 7. While the UE 815 may include a single UE antenna, there may be examples in which the UE 815 may include multiple UE antennas 840.

The UE wireless communication management module 860 may be configured to perform or control some or all of the UE or apparatus features or functions described with reference to FIG. 1, 2, 3, 4, or 5 related to wireless communication over the dedicated radio frequency spectrum band or the shared radio frequency spectrum band. For example, the UE wireless communication management module 860 may be configured to support a supplemental downlink mode (e.g., a licensed assisted access mode), a carrier aggregation mode, or a standalone mode using the dedicated radio frequency spectrum band or the shared radio frequency spectrum band. The UE wireless communication management module 860 may include a UE LTE/LTE-A module for dedicated RF spectrum band 865 configured to handle LTE/LTE-A communications in the dedicated radio frequency spectrum band, and a UE LTE/LTE-A module for shared RF spectrum band 870 configured to handle LTE/LTE-A communications in the shared radio frequency spectrum band. The UE wireless communication management module 860, or portions of it, may include a processor, or some or all of the functions of the UE wireless communication management module 860 may be performed by the UE processor module 810 or in connection with the UE processor module 810. In some examples, the UE wireless communication management module 860 may be an example of the wireless communication management module 420 or 520 described with reference to FIG. 4 or 5.

Figure 9:
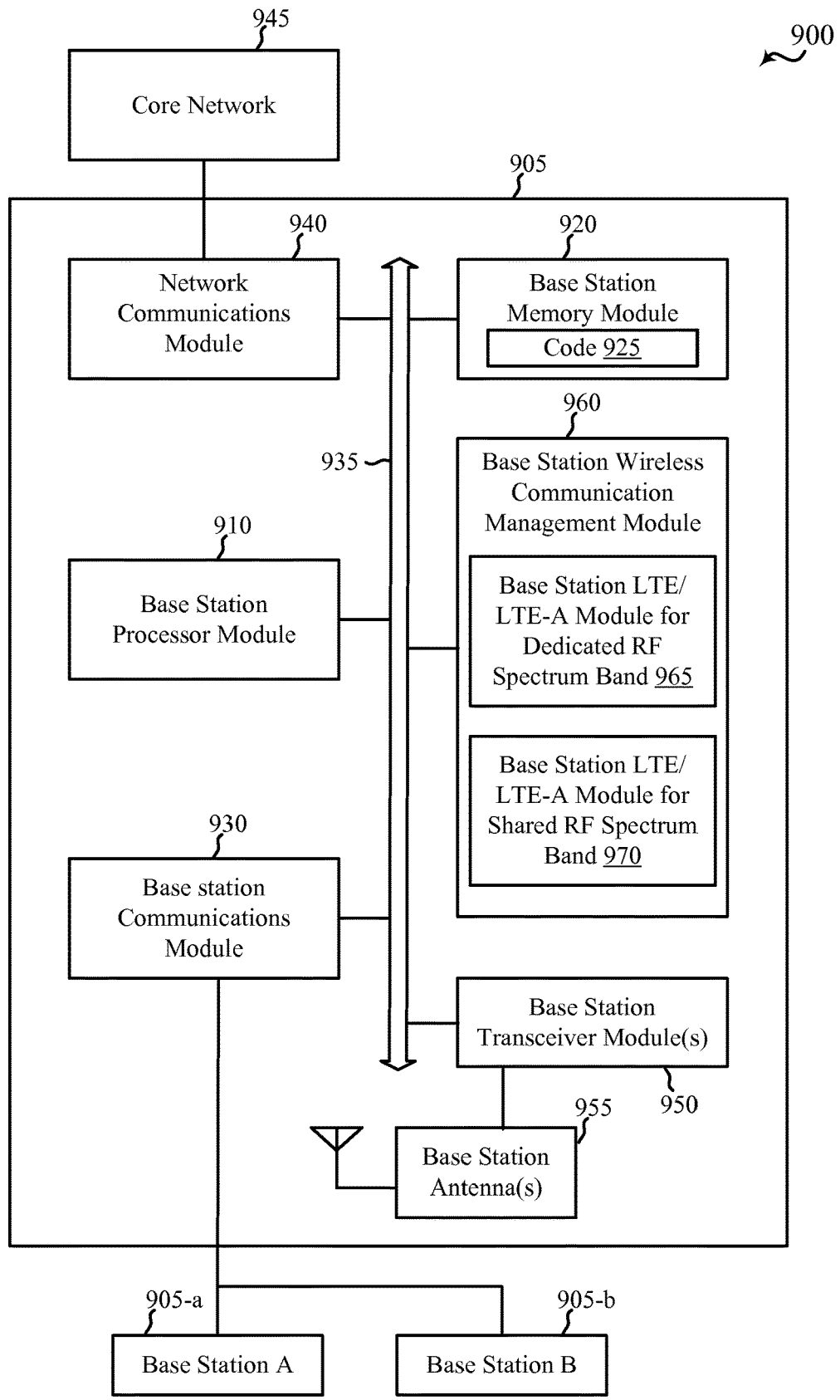
FIG. 9 shows a block diagram of a base station (e.g., a base station forming part or all of an eNB) for use in wireless communication, in accordance with various aspects of the present disclosure.

FIG. 9 shows a block diagram 900 of a base station 905 (e.g., a base station forming part or all of an eNB) for use in wireless communication, in accordance with various aspects of the present disclosure. In some examples, the base station 905 may be an example of one or more aspects of the base station 105, 205, 205-a, or 305 described with reference to FIG. 1, 2, or 3, or aspects of the apparatus 605 or 705 described with reference to FIG. 6 or 7. The base station 905 may be configured to implement or facilitate at least some of the base station features and functions described with reference to FIG. 1, 2, 3, 6, or 7.

The base station 905 may include a base station processor module 910, a base station memory module 920, at least one base station transceiver module (represented by base station transceiver module(s) 950), at least one base station antenna (represented by base station antenna(s) 955), or a base station wireless communication management module 960. The base station 905 may also include one or more of a base station communications module 930 or a network communications module 940. Each of these components may be in communication with each other, directly or indirectly, over one or more buses 935.

The base station memory module 920 may include RAM or ROM. The base station memory module 920 may store computer-readable, computer-executable code 925 containing instructions that are configured to, when executed, cause the base station processor module 910 to perform various functions described herein related to wireless communication, including, for example, determining that a UE is exposed to bursty interference and modifying a link adaptation for the UE or a transmission schedule for the UE based at least in part on the bursty interference. Alternatively, the code 925 may not be directly executable by the base station processor module 910 but be configured to cause the base station 905 (e.g., when compiled and executed) to perform various of the functions described herein.

The base station processor module 910 may include an intelligent hardware device, e.g., a CPU, a microcontroller, an ASIC, etc. The base station processor module 910 may process information received through the base station transceiver module(s) 950, the base station communications module 930, or the network communications module 940. The base station processor module 910 may also process information to be sent to the transceiver module(s) 950 for transmission through the antenna(s) 955, to the base station communications module 930, for transmission to one or more other base stations 905-a and 905-b, or to the network communications module 940 for transmission to a core network 945, which may be an example of one or more aspects of the core network 130 described with reference to FIG. 1. The base station processor module 910 may handle, alone or in connection with the base station wireless communication management module 960, various aspects of communicating over (or managing communications over) a dedicated radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)).

The base station transceiver module(s) 950 may include a modem configured to modulate packets and provide the modulated packets to the base station antenna(s) 955 for transmission, and to demodulate packets received from the base station antenna(s) 955. The base station transceiver module(s) 950 may, in some examples, be implemented as one or more base station transmitter modules and one or more separate base station receiver modules. The base station transceiver module(s) 950 may support communications in the dedicated radio frequency spectrum band or the shared radio frequency spectrum band. The base station transceiver module(s) 950 may be configured to communicate bi-directionally, via the antenna(s) 955, with one or more UEs or apparatuses, such as one or more of the UEs 115, 215, 215-a, 215-b, 215-c, 315, or 815 described with reference to FIG. 1, 2, 3, or 8, or one or more of the apparatuses 415 or 515 described with reference to FIG. 4 or 5. The base station 905 may, for example, include multiple base station antennas 955 (e.g., an antenna array). The base station 905 may communicate with the core network 945 through the network communications module 940. The base station 905 may also communicate with other base stations, such as the base stations 905-a and 905-b, using the base station communications module 930.

The base station wireless communication management module 960 may be configured to perform or control some or all of the features or functions described with reference to FIG. 1, 2, 3, 6, or 7 related to wireless communication over the dedicated radio frequency spectrum band or the shared radio frequency spectrum band. For example, the base station wireless communication management module 960 may be configured to support a supplemental downlink mode (e.g., a licensed assisted access mode), a carrier aggregation mode, or a standalone mode using the dedicated radio frequency spectrum band or the shared radio frequency spectrum band. The base station wireless communication management module 960 may include a base station LTE/LTE-A module for dedicated RF spectrum band 965 configured to handle LTE/LTE-A communications in the dedicated radio frequency spectrum band, and a base station LTE/LTE-A module for shared RF spectrum band 970 configured to handle LTE/LTE-A communications in the shared radio frequency spectrum band. The base station wireless communication management module 960, or portions of it, may include a processor, or some or all of the functions of the base station wireless communication management module 960 may be performed by the base station processor module 910 or in connection with the base station processor module 910. In some examples, the base station wireless communication management module 960 may be an example of the wireless communication management module 620 or 720 described with reference to FIG. 6 or 7.

Figure 10:
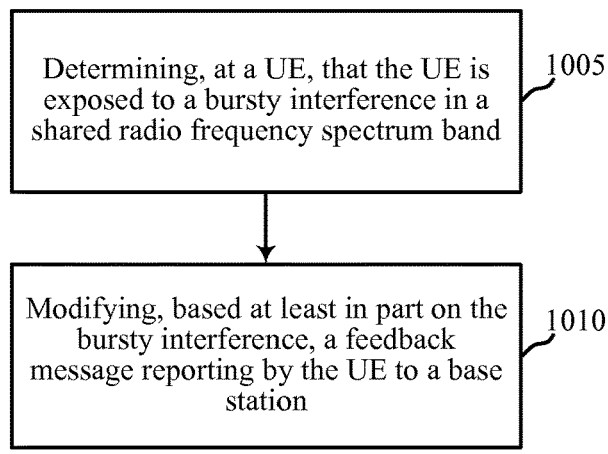
FIG. 10 is a flow chart illustrating an exemplary method for wireless communication, in accordance with various aspects of the present disclosure.

FIG. 10 is a flow chart illustrating an exemplary method 1000 for wireless communication, in accordance with various aspects of the present disclosure. For clarity, the method 1000 is described below with reference to aspects of one or more of the UEs 115, 215, 215-a, 215-b, 215-c, 315, or 815 described with reference to FIG. 1, 2, 3, or 8, or aspects of one or more of the apparatuses 415 or 515 described with reference to FIG. 4 or 5. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1005, the method 1000 may include determining, at a UE, that the UE is exposed to a bursty interference in a shared radio frequency spectrum band. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). The operation(s) at block 1005 may be performed using the wireless communication management module 420, 520, or 860 described with reference to FIG. 4, 5, or 8, or the bursty interference determination module 435 or 535 described with reference to FIG. 4 or 4.

At block 1010, the method 1000 may include modifying, based at least in part on the bursty interference, a feedback message reporting by the UE to a base station. The operation(s) at block 1010 may be performed using the wireless communication management module 420, 520, or 860 described with reference to FIG. 4, 5, or 8, or the feedback message reporting modification module 440 or 540 described with reference to FIG. 4 or 5.

Thus, the method 1000 may provide for wireless communication. It should be noted that the method 1000 is just one implementation and that the operations of the method 1000 may be rearranged or otherwise modified such that other implementations are possible.

Figure 11:
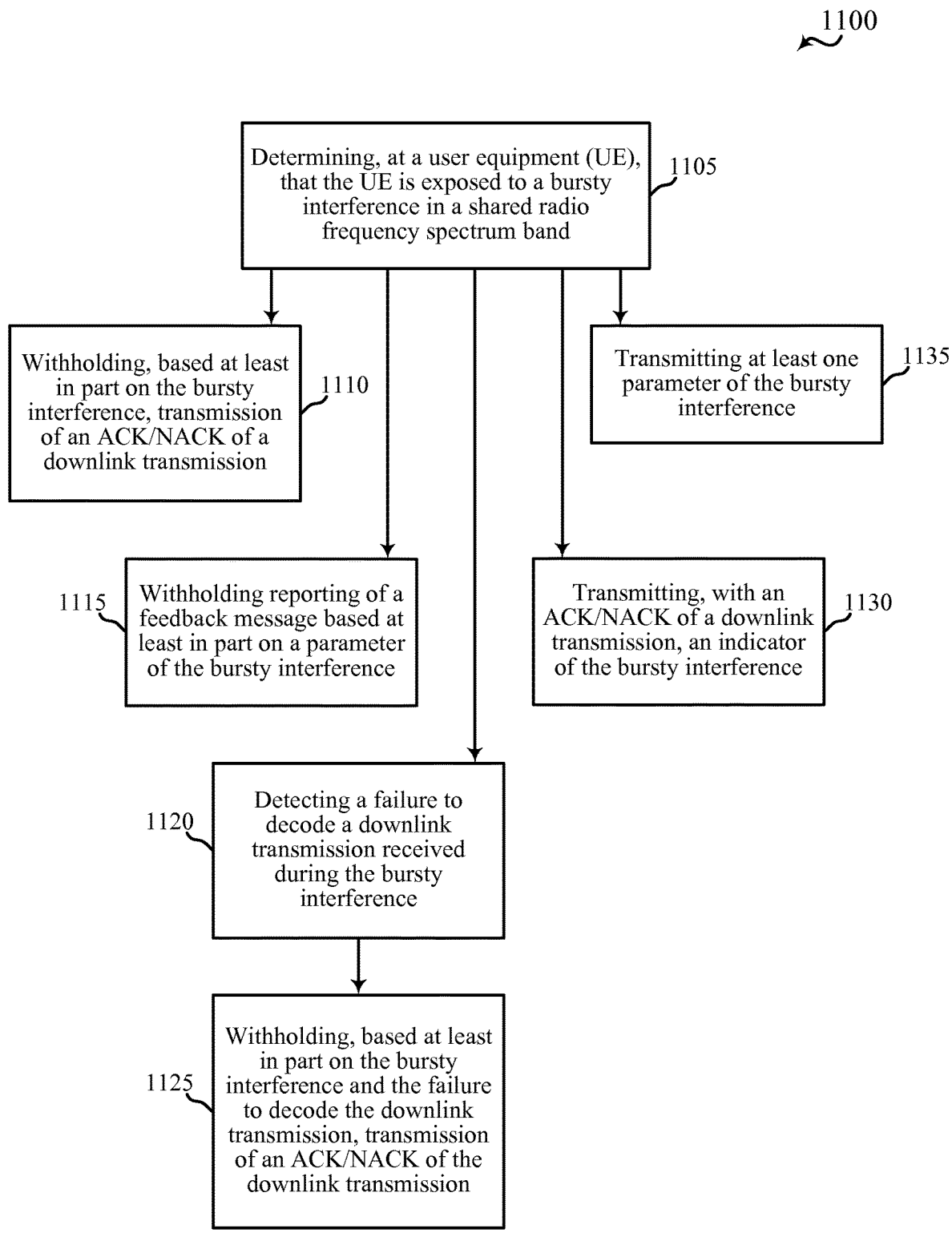
FIG. 11 is a flow chart illustrating an exemplary method for wireless communication, in accordance with various aspects of the present disclosure.

FIG. 11 is a flow chart illustrating an exemplary method 1100 for wireless communication, in accordance with various aspects of the present disclosure. For clarity, the method 1100 is described below with reference to aspects of one or more of the UEs 115, 215, 215-*a*, 215-*b*, 215-*c*, 315, or 815 described with reference to FIG. 1, 2, 3, or 8, or aspects of one or more of the apparatuses 415 or 515 described with reference to FIG. 4 or 5. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1105, the method 1100 may include determining, at a UE, that the UE is exposed to a bursty interference in a shared radio frequency spectrum band. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner).

In some examples, determining that the UE is exposed to a bursty interference may include determining at least one parameter of the bursty interference. In some examples, determining that the UE is exposed to a bursty interference may include determining that a parameter of the bursty interference (e.g., a strength of the bursty interference or a duration of the bursty interference) satisfies a threshold (or by determining that a plurality of parameters of the bursty interference satisfy respective thresholds). In some examples, the at least one parameter of the bursty interference may include one or more of: a strength of the bursty interference, a duration of the bursty interference; a pattern of the bursty interference; a periodicity of the bursty interference; a preamble (e.g., a Wi-Fi preamble) contained in the bursty interference; a transmission format associated with the bursty interference (e.g., a format used for an ACK, NACK, RTS, or CTS transmission); or a wireless standard (e.g., a Wi-Fi standard) associated with the bursty interference. In some examples, part or all of a received packet header may be decoded to determine one or more parameters.

The operation(s) at block 1105 may be performed using the wireless communication management module 420, 520, or 860 described with reference to FIG. 4, 5, or 8, the bursty interference determination module 435 or 535 described with reference to FIG. 4 or 5, or the parameter determination module 545 or threshold comparison module 550 described with reference to FIG. 5.

In one or more of a number of alternative flows, at block 1110, at block 1115 and block 1120, at block 1125, at block 1130, or at block 1135, the method 1100 may include modifying, based at least in part on the bursty interference, a feedback message reporting by the UE to a base station. At block 1110, the method 1100 may include withholding, based at least in part on the bursty interference, transmission of an ACK/NACK of a downlink transmission (e.g., a downlink transmission received during the bursty interference). The operation(s) at block 1110 may be performed using the wireless communication management module 420, 520, or 860 described with reference to FIG. 4, 5, or 8, the feedback message reporting modification module 440 or 540 described with reference to FIG. 4 or 5, or the feedback message withholding module 560 described with reference to FIG. 5.

At block 1115, the method 1100 may include withholding reporting of a feedback message (e.g., transmission of an ACK/NACK) based at least in part on a parameter of the bursty interference satisfying a threshold. In some examples, the parameter of the bursty interference may include a strength of the bursty interference or a duration of the bursty interference. The operation(s) at block 1115 may be performed using the wireless communication management module 420, 520, or 860 described with reference to FIG. 4, 5, or 8, the feedback message reporting modification module 440 or 540 described with reference to FIG. 4 or 5, or the feedback message withholding module 560 described with reference to FIG. 5.

At block 1120, the method 1100 may include detecting a failure to decode a downlink transmission received during the bursty interference. At block 1125, the method 1100 may include withholding, based at least in part on the bursty interference and the failure to decode the downlink transmission, transmission of an ACK/NACK of the downlink transmission. The operation(s) at block 1120 may be performed using the wireless communication management module 420, 520, or 860 described with reference to FIG. 4, 5, or 8, or the decoding failure detection module 555 described with reference to FIG. 5.

At block 1125, the method 1100 may include withholding, based at least in part on the bursty interference and the failure to decode the downlink transmission, a transmission of an ACK/NACK of the downlink transmission. The operation(s) at block 1125 may be performed using the wireless communication management module 420, 520, or 860 described with reference to FIG. 4, 5, or 8, the feedback message reporting modification module 440 or 540 described with reference to FIG. 4 or 5, or the feedback message withholding module 560 described with reference to FIG. 5.

At block 1130, the method 1100 may include transmitting, with an ACK/NACK of a downlink transmission, an indicator of the bursty interference. The operation(s) at block 1130 may be performed using the wireless communication management module 420, 520, or 860 described with reference to FIG. 4, 5, or 8, the feedback message reporting modification module 440 or 540 described with reference to FIG. 4 or 5, or the bursty interference indicator module 565 described with reference to FIG. 5.

At block 1135, the method 1100 may include transmitting at least one parameter of the bursty interference (as determined at block 1105). In some examples, the at least one parameter of the bursty interference may be transmitted with an ACK/NACK of a downlink transmission. In some examples, the at least one parameter of the bursty interference may be transmitted via semi-static signaling, upon request of a base station, upon a trigger event (e.g., a confidence level), or at a slower rate than may occur when transmitting the at least one parameter of the bursty interference with an ACK/NACK of a downlink transmission. The operation(s) at block 1135 may be performed using the wireless communication management module 420, 520, or 860 described with reference to FIG. 4, 5, or 8, the feedback message reporting modification module 440 or 540 described with reference to FIG. 4 or 5, or the bursty interference parameter reporting module 565 described with reference to FIG. 5.

Thus, the method 1100 may provide for wireless communication. It should be noted that the method 1100 is just one implementation and that the operations of the method 1100 may be rearranged or otherwise modified such that other implementations are possible. In some examples, operation(s) of the methods 1000 and 1100 described with reference to FIGS. 10 and 11 may be combined.

Figure 12:
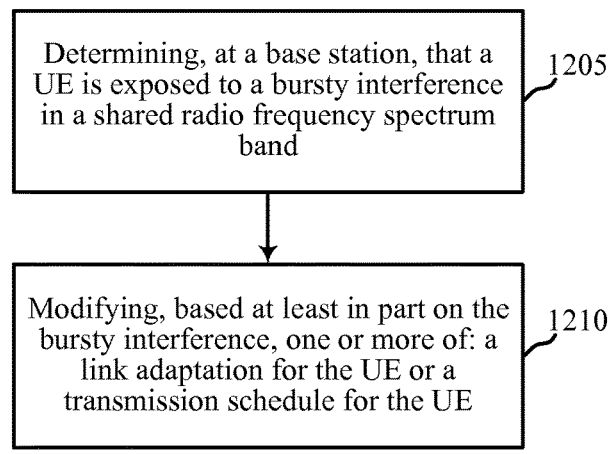
FIG. 12 is a flow chart illustrating an exemplary method for wireless communication, in accordance with various aspects of the present disclosure.

FIG. 12 is a flow chart illustrating an exemplary method 1200 for wireless communication, in accordance with various aspects of the present disclosure. For clarity, the method 1200 is described below with reference to aspects of one or more of the base stations 105, 205, 205-*a*, 305, or 905 described with reference to FIG. 1, 2, 3, or 9, or aspects of one or more of the apparatuses 605 or 705 described with reference to FIG. 6 or 7. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1205, the method 1200 may include determining, at a base station, that a UE is exposed to a bursty interference in a shared radio frequency spectrum band. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). The operation(s) at block 1205 may be performed using the wireless communication management module 620, 720, or 960 described with reference to FIG. 6, 7, or 9, or the bursty interference determination module 635 or 735 described with reference to FIG. 6 or 7.

At block 1210, the method 1200 may include modifying, based at least in part on the bursty interference, one or more of: a link adaptation for the UE or a transmission schedule for the UE. The operation(s) at block 1210 may be performed using the wireless communication management module 620, 720, or 960 described with reference to FIG. 6, 7, or 9, or the feedback message response module 640 or 740 described with reference to FIG. 6 or 7.

Thus, the method 1200 may provide for wireless communication. It should be noted that the method 1200 is just one implementation and that the operations of the method 1200 may be rearranged or otherwise modified such that other implementations are possible.

Figure 13:
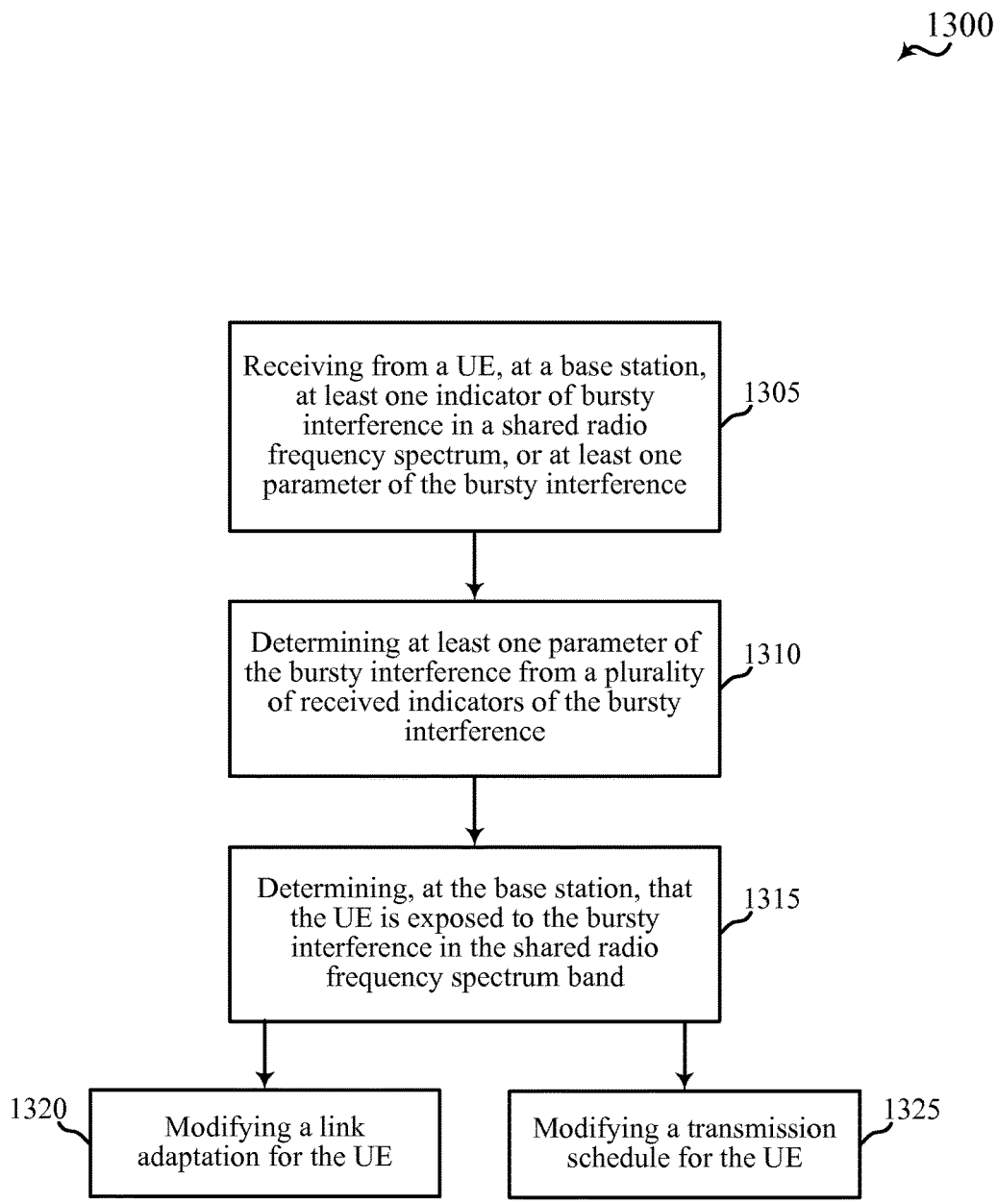
FIG. 13 is a flow chart illustrating an exemplary method for wireless communication, in accordance with various aspects of the present disclosure.

FIG. 13 is a flow chart illustrating an exemplary method 1300 for wireless communication, in accordance with various aspects of the present disclosure. For clarity, the method 1300 is described below with reference to aspects of one or more of the base stations 105, 205, 205-*a*, 305, or 905 described with reference to FIG. 1, 2, 3, or 9, or aspects of one or more of the apparatuses 605 or 705 described with reference to FIG. 6 or 7. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1305, the method 1300 may optionally include receiving from a UE, at a base station, at least one indicator of bursty interference in a shared radio frequency spectrum, or at least one parameter of the bursty interference. The shared radio frequency spectrum band may include a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner). The operation(s) at block 1305 may be performed using the wireless communication management module 620, 720, or 960 described with reference to FIG. 6, 7, or 9, or the UE transmission processing module 745 described with reference to FIG. 7.

At block 1310, the method 1300 may optionally include determining at least one parameter of the bursty interference from a plurality of received indicators of the bursty interference. In some examples, the at least one received or determined parameter of the bursty interference may include one or more of: a strength of the bursty interference, a duration of the bursty interference; a pattern of the bursty interference; a periodicity of the bursty interference; a preamble (e.g., a Wi-Fi preamble) contained in the bursty interference; a transmission format associated with the bursty interference (e.g., a format used for an ACK, NACK, RTS, or CTS transmission); or a wireless standard (e.g., a Wi-Fi standard) associated with the bursty interference. In some examples, part or all of a received packet header may be decoded to determine one or more parameters. The operation(s) at block 1310 may be performed using the wireless communication management module 620, 720, or 960 described with reference to FIG. 6, 7, or 9, or the parameter determination module 750 described with reference to FIG. 7.

At block 1315, the method 1300 may include determining, at the base station, that the UE is exposed to the bursty interference in the shared radio frequency spectrum band. In some examples, determining that the UE is exposed to the bursty interference may include detecting a failure to receive, from the UE, an ACK/NACK of a downlink transmission. In some examples, a determination that the UE is exposed to the bursty interference may be based at least in part on receiving, from the UE, an indicator of the bursty interference (or a plurality of indicators of the bursty interference) from the UE. In some examples, a determination that the UE is exposed to the bursty interference may be based at least in part on receiving, from the UE, at least one parameter of the bursty interference. In some examples, determining that the UE is exposed to the bursty interference may include predicting an occurrence of the bursty interference (e.g., based at least in part on at least one received or determined parameter of the bursty interference). The operation(s) at block 1315 may be performed using the wireless communication management module 620, 720, or 960 described with reference to FIG. 6, 7, or 9, or the bursty interference determination module 635 or 735 described with reference to FIG. 6 or 7.

At block 1320 or block 1325, the method 1300 may include modifying, based at least in part on the bursty interference, one or more of: a link adaptation for the UE or a transmission schedule for the UE. In some examples, the modifying may be performed for a predicted occurrence of the bursty interference. At block 1320, the method 1300 may include modifying a link adaptation for the UE. In some examples, modifying the link adaption for the UE may include foregoing (e.g., temporarily freezing or preventing modification of) an OLLA for the UE. In some examples, foregoing the OLLA for the UE may be based at least in part on a failure to receive an ACK/NACK of a downlink transmission, based on at least one indicator of the bursty interference received from the UE, or based on at least one parameter of the bursty interference. The operation(s) at block 1320 may be performed using the wireless communication management module 620, 720, or 960 described with reference to FIG. 6, 7, or 9, the feedback message response module 640 or 740 described with reference to FIG. 6 or 7, or the link adaptation modification module 755 described with reference to FIG. 7.

At block 1325, the method 1300 may include modifying a transmission schedule for the UE. In some examples, modifying the transmission schedule for the UE may include foregoing a transmission to the UE, not scheduling the UE in subframes during which bursty interference is predicted, or scheduling the UE with a reduced MCS or rank in a subframe during which bursty interference is predicted. In some examples, foregoing the transmission to the UE may be based on at least one indicator of the bursty interference or at least one parameter of the bursty interference. In some examples, there may be a direct causal relationship between receipt or determination of an indicator or parameter of the bursty interference and modification of the transmission schedule for the UE (e.g., upon receipt of an indicator of the bursty interference, a next transmission to the UE may be foregone). In some examples, there may be an indirect causal relationship between receipt or determination of an indicator or parameter of the bursty interference and modification of the transmission schedule for the UE (e.g., at least one transmission to the UE may be foregone based at least in part on an anticipated pattern or periodicity of the bursty interference). The operation(s) at block 1325 may be performed using the wireless communication management module 620, 720, or 960 described with reference to FIG. 6, 7, or 9, the feedback message response module 640 or 740 described with reference to FIG. 6 or 7, or the transmission schedule modification module 760 described with reference to FIG. 7.

Thus, the method 1300 may provide for wireless communication. It should be noted that the method 1300 is just one implementation and that the operations of the method 1300 may be rearranged or otherwise modified such that other implementations are possible. In some examples, operation(s) of the methods 1200 and 1300 described with reference to FIGS. 12 and 13 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrases "based on" and "based at least in part on" shall not be construed as a reference to a closed set of conditions. For example, an exemplary step that is described as "based at least in part on condition A" may be based on both a condition A and a condition B without departing from the scope of the present disclosure. In other words, as used herein, the phrase "based on" shall be construed in the same manner as the phrase "based at least in part on."

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   receiving, at a user equipment (UE) operating on a first radio access technology (RAT), a downlink transmission from a base station;
   determining, at the UE, that the UE is exposed to a bursty interference during at least a portion of the downlink transmission, wherein the bursty interference is from a second device operating on a second RAT in a shared radio frequency spectrum band, wherein the first RAT and the second RAT are different; and
   modifying, based at least in part on the bursty interference, a feedback message reporting by the UE to the base station, wherein the modifying comprises transmitting a feedback message comprising a pattern of the bursty interference based at least in part on determining that more than one downlink transmission is exposed to more than one instance of the bursty interference.

2. The method of claim 1, wherein determining that the UE is exposed to the bursty interference comprises:
   determining that a parameter of the bursty interference satisfies a threshold.

3. The method of claim 2, wherein modifying the feedback message reporting comprises:
   withholding reporting of the feedback message based at least in part on the parameter of the bursty interference satisfying the threshold.

4. The method of claim 2, wherein the parameter of the bursty interference comprises a strength of the bursty interference or a duration of the bursty interference.

5. The method of claim 1, wherein determining that the UE is exposed to the bursty interference comprises:
   determining at least one parameter of the bursty interference;
   wherein the at least one parameter of the bursty interference comprises one or more of: a strength of the bursty interference; a duration of the bursty interference, the pattern of the bursty interference, a periodicity of the bursty interference, a preamble contained in the bursty interference; a transmission format associated with the bursty interference; or a wireless standard associated with the bursty interference.

6. The method of claim 1, wherein modifying the feedback message reporting comprises:
   withholding, based at least in part on the bursty interference, transmission of an ACK/NACK of the downlink transmission.

7. The method of claim 1, further comprising:
   detecting a failure to decode the downlink transmission received during the bursty interference;

wherein modifying the feedback message reporting comprises withholding, based at least in part on the bursty interference and the failure to decode the downlink transmission, transmission of an ACK/NACK of the downlink transmission.

8. The method of claim 1, wherein modifying the feedback message reporting comprises:
transmitting, with an ACK/NACK of the downlink transmission, an indicator of the bursty interference.

9. The method of claim 1, wherein:
determining the UE is exposed to the bursty interference comprises determining at least one parameter of the bursty interference; and
modifying the feedback message reporting comprises transmitting the at least one parameter of the bursty interference.

10. The method of claim 9, wherein the at least one parameter of the bursty interference comprises one or more of:
a strength of the bursty interference; a duration of the bursty interference; the pattern of the bursty interference; a periodicity of the bursty interference; a preamble contained in the bursty interference; a transmission format associated with the bursty interference; or a wireless standard associated with the bursty interference.

11. The method of claim 9, wherein the at least one parameter of the bursty interference is transmitted with an ACK/NACK of the downlink transmission.

12. The method of claim 9, wherein the at least one parameter of the bursty interference is transmitted via semi-static signaling.

13. An apparatus for wireless communication, comprising:
means for receiving, at a user equipment (UE) operating on a first radio access technology (RAT), a downlink transmission from a base station;
means for determining, at the UE, that the UE is exposed to a bursty interference during at least a portion of the downlink transmission, wherein the bursty interference is from a second device operating on a second RAT in a shared radio frequency spectrum band, wherein the first RAT and the second RAT are different; and
means for modifying, based at least in part on the bursty interference, a feedback message reporting by the UE to the base station, wherein the means for modifying comprises means for transmitting a feedback message comprising a pattern of the bursty interference based at least in part on determining that more than one downlink transmission is exposed to more than one instance of the bursty interference.

14. The apparatus of claim 13, wherein the means for determining that the UE is exposed to the bursty interference comprises:
means for determining that a parameter of the bursty interference satisfies a threshold.

15. The apparatus of claim 14, wherein the means for modifying the feedback message reporting comprises:
means for withholding reporting of the feedback message based at least in part on the parameter of the bursty interference satisfying the threshold.

16. The apparatus of claim 14, wherein the parameter of the bursty interference comprises a strength of the bursty interference or a duration of the bursty interference.

17. The apparatus of claim 13, wherein the means for determining that the UE is exposed to the bursty interference comprises:
means for determining at least one parameter of the bursty interference;
wherein the at least one parameter of the bursty interference comprises one or more of: a strength of the bursty interference; a duration of the bursty interference, the pattern of the bursty interference, a periodicity of the bursty interference, a preamble contained in the bursty interference; a transmission format associated with the bursty interference; or a wireless standard associated with the bursty interference.

18. The apparatus of claim 13, wherein the means for modifying the feedback message reporting comprises:
means for withholding, based at least in part on the bursty interference, transmission of an ACK/NACK of the downlink transmission.

19. The apparatus of claim 13, further comprising:
means for detecting a failure to decode the downlink transmission received during the bursty interference;
wherein the means for modifying the feedback message reporting comprises withholding, based at least in part on the bursty interference and the failure to decode the downlink transmission, transmission of an ACK/NACK of the downlink transmission.

20. The apparatus of claim 13, wherein the means for modifying the feedback message reporting comprises:
means for transmitting, with an ACK/NACK of the downlink transmission, an indicator of the bursty interference.

21. The apparatus of claim 13, wherein:
the means for determining the UE is exposed to the bursty interference comprises means for determining at least one parameter of the bursty interference; and
the means for modifying the feedback message reporting comprises means for transmitting the at least one parameter of the bursty interference.

22. The apparatus of claim 21, wherein the at least one parameter of the bursty interference comprises one or more of:
a strength of the bursty interference; a duration of the bursty interference; the pattern of the bursty interference; a periodicity of the bursty interference; a preamble contained in the bursty interference; a transmission format associated with the bursty interference; or a wireless standard associated with the bursty interference.

23. The apparatus of claim 21, wherein the at least one parameter of the bursty interference is transmitted with an ACK/NACK of the downlink transmission.

24. The apparatus of claim 21, wherein the at least one parameter of the bursty interference is transmitted via semi-static signaling.

25. An apparatus for wireless communication, comprising:
a processor; and
memory coupled to the processor, wherein the processor is configured to:
receive, at a user equipment (UE) operating on a first radio access technology (RAT), a downlink transmission from a base station;
determine, at the UE, that the UE is exposed to a bursty interference during at least a portion of the downlink transmission, wherein the bursty interference is from a second device operating on a second RAT in a shared radio frequency spectrum band, wherein the first RAT and the second RAT are different; and
modify, based at least in part on the bursty interference, a feedback message reporting by the UE to the base station, wherein modifying comprises transmitting a feedback message comprising a pattern of the bursty interference based at least in part on determining that more than one downlink transmission is exposed to more than one instance of the bursty interference.

26. The apparatus of claim 25, wherein determining that the UE is exposed to the bursty interference comprises:
   determining that a parameter of the bursty interference satisfies a threshold.

27. The apparatus of claim 26, wherein modifying the feedback message reporting comprises:
   withholding reporting of the feedback message based at least in part on the parameter of the bursty interference satisfying the threshold.

28. The apparatus of claim 26, wherein the parameter of the bursty interference comprises a strength of the bursty interference or a duration of the bursty interference.

29. The apparatus of claim 25, wherein determining that the UE is exposed to the bursty interference comprises:
   determining at least one parameter of the bursty interference;
   wherein the at least one parameter of the bursty interference comprises one or more of: a strength of the bursty interference; a duration of the bursty interference, the pattern of the bursty interference, a periodicity of the bursty interference, a preamble contained in the bursty interference; a transmission format associated with the bursty interference; or a wireless standard associated with the bursty interference.

30. The apparatus of claim 25, wherein modifying the feedback message reporting comprises:
   withholding, based at least in part on the bursty interference, transmission of an ACK/NACK of the downlink transmission.

31. The apparatus of claim 25, wherein the processor is further configured to:
   detect a failure to decode the downlink transmission received during the bursty interference;
   wherein modifying the feedback message reporting comprises withholding, based at least in part on the bursty interference and the failure to decode the downlink transmission, transmission of an ACK/NACK of the downlink transmission.

32. The apparatus of claim 25, wherein modifying the feedback message reporting comprises:
   transmitting, with an ACK/NACK of the downlink transmission, an indicator of the bursty interference.

33. The apparatus of claim 25, wherein:
   determining the UE is exposed to the bursty interference comprises determining at least one parameter of the bursty interference; and
   modifying the feedback message reporting comprises transmitting the at least one parameter of the bursty interference.

34. A non-transitory computer-readable medium for storing instructions executable by a processor, comprising:
   instructions to receive, at a user equipment (UE) operating on a first radio access technology (RAT), a downlink transmission from a base station;
   instructions to determine, at the UE, that the UE is exposed to a bursty interference during at least a portion of the downlink transmission, wherein the bursty interference is from a second device operating on a second RAT in a shared radio frequency spectrum band, wherein the first RAT and the second RAT are different; and
   instructions to modify, based at least in part on the bursty interference, a feedback message reporting by the UE to the base station, wherein modifying comprises transmitting a feedback message comprising a pattern of the bursty interference based at least in part on determining that more than one downlink transmission is exposed to more than one instance of the bursty interference.

35. The computer-readable medium of claim 34, wherein the instructions to modify the feedback message reporting comprise:
   instructions to transmit, with an ACK/NACK of the downlink transmission, an indicator of the bursty interference.

36. The computer-readable medium of claim 34, wherein:
   the instructions to determine the UE is exposed to the bursty interference comprise instructions to determine at least one parameter of the bursty interference; and
   the instructions to modify the feedback message reporting comprise instructions to transmit the at least one parameter of the bursty interference.

* * * * *